United States Patent [19]

Specker et al.

[11] 4,285,769
[45] Aug. 25, 1981

[54] CONTROL CELL NUCLEAR REACTOR CORE

[75] Inventors: Steven R. Specker, San Jose; Craig D. Sawyer, Los Gatos; Russell L. Crowther, Saratoga, all of Calif.; Bennett J. Gitnick, Rockville, Md.; Kenneth V. Walters, Kennewick, Wash.; Robert E. Brown; Larry E. Fennern, both of San Jose, Calif.

[73] Assignee: General Electric Company, San Jose, Calif.

[21] Appl. No.: 952,846

[22] Filed: Oct. 19, 1978

[51] Int. Cl.³ .............................................. G21C 19/20
[52] U.S. Cl. ...................................... 176/30; 176/17; 176/86 R; 176/94
[58] Field of Search ..................... 176/30, 94, 17, 86 R

[56] References Cited

U.S. PATENT DOCUMENTS

| | | | |
|---|---|---|---|
| 3,141,827 | 7/1964 | Iskenderian | 176/17 |
| 3,799,839 | 3/1974 | Fischer | 176/20 R |
| 3,844,886 | 10/1974 | Crowther | 176/17 |
| 4,057,466 | 11/1977 | Thompson | 176/20 R |

*Primary Examiner*—Donald P. Walsh
*Attorney, Agent, or Firm*—Ivor J. James, Jr.; Samuel E. Turner; Raymond G. Simkins

[57] ABSTRACT

A method and arrangement for operating a boiling water nuclear reactor and fuel assembly designs for such reactor wherein the reactor is operated with uniquely located control rods that serve the primary functions of power shaping and reactivity control. A second and separate distinct group of control rods is withdrawn when the reactor is at power and the control rods of this group serve the primary function of reactor shutdown. The design of the fuel assemblies and the selected patterns of fuel assemblies and control rods make the separation of control functions feasible. The power shaping and reactivity control control rods are located in low power regions of the core designated control cells. The design of the fuel is such that the control rods of the control cells may remain in fixed positions in these cells during the operating cycle until withdrawal for burnup reactivity compensation.

33 Claims, 25 Drawing Figures

| | |
|---|---|
| $C_i$ | – Fig. 4B |
| $N_a$ | – Fig. 4C |
| $N_b$ | – Fig. 4D |
| $I_i$ | – Fig. 4E |
| $P_i$ | – Fig. 4F |

ASSEMBLY TYPE $C_i$

| Elements | No. | U-235 w/o |
|---|---|---|
| 1 | 27 | 1.2 |
| 2 | 35 | 0.711 |

|  | ASSEMBLY TYPE $N_a$ | | |
|---|---|---|---|
| Element | No. | U-235 w/o | Gd w/o |
| 1 | 18 | 2.2 | |
| 2 | 23 or 25 | 1.7 | |
| 3 | 14 | 1.2 | |
| 4 | 5 | 0.711 | |
| 5 | 0 or 2 | 1.7 | 6 |

| Element | ASSEMBLY No. | TYPE $N_a$ U-235 w/o | Gd w/o |
|---|---|---|---|
| 1 | 22 or 23 | 3.3 | |
| 2 | 16 | 2.4 | |
| 3 | 8 | 2.2 | |
| 4 | 8 | 2.0 | |
| 5 | 3 | 1.7 | |
| 6 | 1 | 1.2 | |
| BA | 4 or 3 | 3.0 | 5 |

| | ASSEMBLY TYPE $1_i$ | | |
|---|---|---|---|
| Element | No. | U-235 w/o | Gd w/o |
| 1 | 23 | 3.8 | |
| 2 | 24 | 2.6 | |
| 3 | 8 | 2.2 | |
| 4 | 3 | 1.7 | |
| 5 | 3 | 1.2 | |
| BA | 1 | 3.0 | 3 |

ASSEMBLY TYPE P$_i$

| Element | No. | U-235 w/o |
|---|---|---|
| 1 | 62 | 0.711 |

CONTROL CELL GROUPS $N_0$ — Fresh Fuel (Fig. 7)
$N_1$ — Fuel exposed one prior cycle
$N_2$ — Fuel exposed two prior cycles
$C_3$ & $P_3$ — Fuel exposed three prior cycles $N_0$ — Fresh Fuel (Fig. 7)

$N_1$ — Fuel exposed one prior cycle $N_2$, $C_2$ — Fuel exposed two prior cycles $N_3$, $C_3$, $P_3$ — Fuel exposed three prior cycles $P_4$ — Fuel exposed four prior cycles

Fig. 6B

N₀ - Fresh Fuel (Fig. 7)

N₁ - Fuel exposed one prior cycle

N₂, C₂ - Fuel exposed two prior cycles

N₃, C₃, P₃ - Fuel exposed three prior cycles

P₄ - Fuel exposed four prior cycles

*Fig. 6C*

RELOAD ASSEMBLY

| Element | No. | U-235 w/o | Gd w/o |
|---------|------|-----------|--------|
| 1 | 18 | 3.8 | |
| 2 | 8 or 10 | 3.0 | |
| 3 | 14 | 2.6 | |
| 4 | 2 | 2.4 | |
| 5 | 8 | 2.2 | |
| 6 | 3 | 1.7 | |
| 7 | 1 | 1.2 | |
| BA | 8 or 6 | 3.0 | 3 |

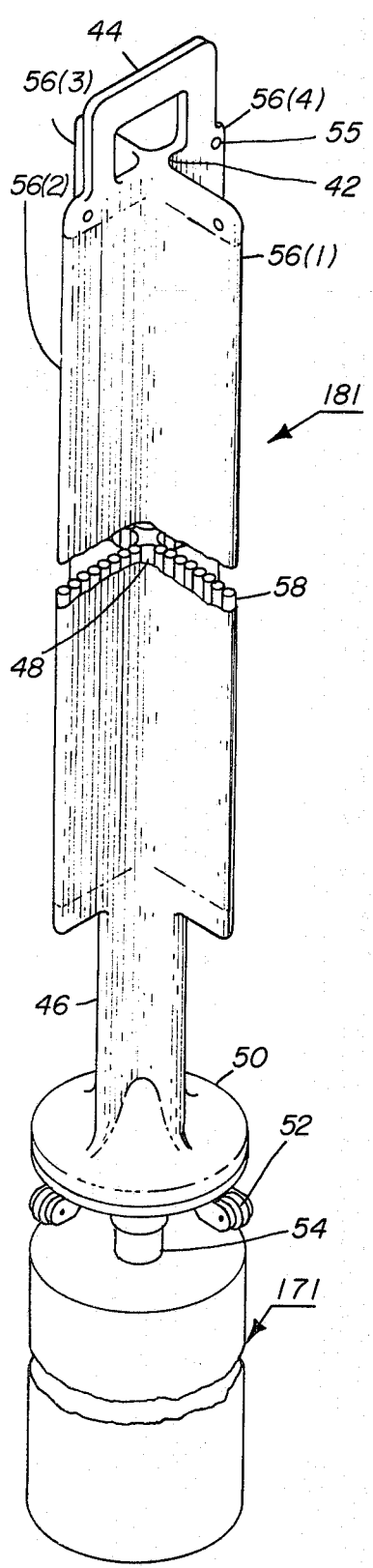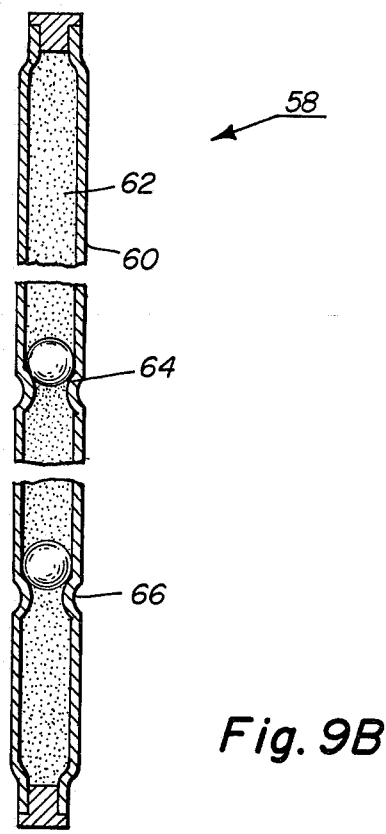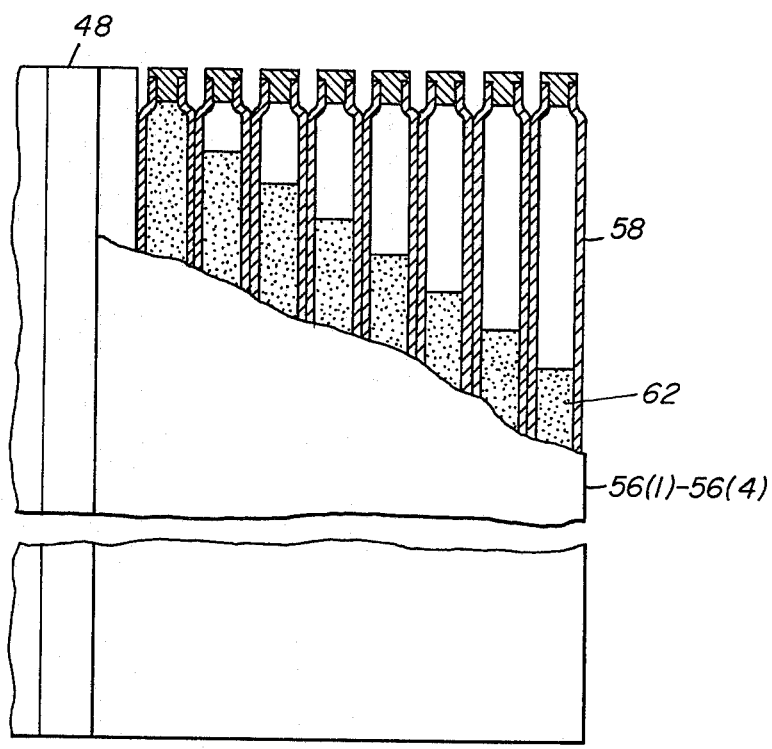
Fig. 9A
Fig. 9B
Fig. 9C

CONTROL CELL NUCLEAR REACTOR CORE

BACKGROUND

The invention relates to a design and arrangement of fuel for a nuclear reactor and to a method of operating such an arrangement.

Nuclear fuels include uranium and/or plutonium in suitable form. For example, in commonly used fuel for water cooled and moderated nuclear power reactors the fuel comprises uranium dioxide ($UO_2$) in which from about 0.7 to 4.0 percent is fissile U-235 mixed with fertile U-238. During operation in the reactor some of the fertile U-238 is converted to fissile Pu-239 and Pu-241 which contributes to maintenance of reactor power. The U-238 also is fissile but only for high energy neutrons in the reactor.

In well-known commercial boiling water nuclear power reactors, for example as used in the Dresden Nuclear Power Station near Chicago, Illinois, the nuclear fuel typically is in the form of sintered pellets contained in an elongated cladding tube, formed of a suitable metal such as a zirconium alloy, to form a fuel element or rod as shown, for example, in U.S. Pat. No. 3,365,371. The tube, sealed by end plugs, serves to isolate the nuclear fuel from the moderator-coolant and to prevent the release of fission products.

Such fuel elements are arranged in groups and supported between upper and lower tie plates in separately replaceable fuel assemblies or bundles as shown, for example, in U.S. Pat. No. 3,689,358. A sufficient number of such fuel assemblies are arranged in a matrix, approximating a right circular cylinder, to form the nuclear reactor core capable of self-sustained fission reaction. The core is submerged in a fluid, such as light water, which serves both as a working fluid and a neutron moderator.

Nuclear reactors are typically refueled periodically with an excess of reactivity sufficient to maintain operation throughout an operating cycle often in the order of one year in length of time. The reactor is then shut down and a fraction of the fuel assemblies typically about one-quarter of the fuel assemblies, are replaced. The excess reactivity at the beginning of a cycle of operation requires a control system of sufficient strength to maintain the effective multiplication factor at unity during reactor operation. The control system customarily comprises neutron absorbing materials that serve to control the neutron population by nonfission absorption or capture of neutrons.

Typically, the control system includes mechanical control in the form of a plurality of control rods, containing neutron absorbing material, which are selectively insertable in the spaces or gaps among the fuel assemblies to control the reactivity, and hence the power level of operation, of the core. In a known arrangement, such as shown for example in U.S. Pat. No. 3,020,888, the control rod blades have a cross or cruciform transverse cross section whereby the "wings" of the blades of each control rod are insertable in the spaces between an adjacent four fuel assemblies. Each such cluster of four fuel assemblies surrounding a control rod can be called a core "cell". (Suitable neutron absorbing materials and control blade drive mechanism are set forth in the above-mentioned U.S. Pat. No. 3,020,888.)

The control system may also include a burnable neutron absorber, such as gadolinium, blended with some of the fuel. The naturally occurring Gd-155 and Gd-157 isotopes are strong neutron absorbers which are converted by neutron absorption to isotopes of lesser control worth (neutron absorbing capacity). Such use of burnable absorbers decreases the amount of mechanical control required and, by appropriate arrangement of the burnable absorber, improvements in power distribution can be achieved. Frequently such burnable absorbers are incorporated in the fuel elements in a mixture with selected portions of the nuclear fuel. An arrangement of burnable absorber is shown, for example, in U.S. Pat. No. 3,799,839.

Further information on nuclear reactors may be found, for example in "Nuclear Power Engineering", N. M. El-Wakil, McGraw-Hill Book Company, Inc., 1962.

The tubular fuel element cladding, which may be in the order of 0.032 inches (0.8 mm) in thickness, is subjected to relatively severe service because of the high pressure, high temperature, nuclear radiation and chemical fission product attack in the environment of the nuclear reactor core. Withdrawal of inserted control rods sharply increases local power in adjacent fuel elements. Such sudden large changes in the local linear power level (kw/ft) of fuel can cause high local stresses and strains from interaction of the fuel pellets with the cladding. If the expanding, separating edges of adjacent pellets (or adjacent sides of a pellet crack) lock against the cladding, the resulting localized strain may exceed the ultimate strain of the cladding and cause cracks therein which permit entry of coolant into the fuel element and escape of fission products from the fuel element into the surrounding coolant. This undesirable phenomenon has become known as "pellet-cladding interaction." There is a fuel burnup dependent threshold below which the cladding is known not to fail, independent of the magnitude of increase in linear power.

Among the proposed solutions to the pellet-cladding interaction (PCI) problem a method for conditioning the fuel to withstand subsequent rapid power changes has come into use. Such method is described in U.S. Pat. No. 4,057,466. Briefly, the method comprises a regulated, systematic control of the rate of power increase (e.g., less than 0.1 kw/ft/hr) to permit the local PCI producing pellet forces to relax. The rate is controlled below the critical rate which causes cladding damage for increases in local linear power between the PCI threshold and the desired maximum local linear power level. After such conditioning it is found that relatively rapid power changes, below the maximum conditioned level, can be made without cladding damage. The primary disadvantage of the method is the relatively lengthy time required for such conditioning or reconditioning since it decreases the time available for operation at normal power levels. Also, in many practical operating situations it is impossible to fully condition fuel near inserted control rods.

Another phenomenon attendant the operation of a nuclear reactor is called "control rod history." The effect of the presence of a control rod blade is to reduce greatly the rate of fissile fuel burn-up in the adjacent fuel whereas the conversion of fertile U-238 to fissile Pu-239 is reduced to a significantly lesser extent. Thus when a control rod is withdrawn, the power in the "uncovered" fuel nearest to the control rod (i.e., in the corner and adjacent peripheral fuel elements of the fuel assembly) increases to a greater extent than in the fuel further removed from the control rod. This control rod history effect is greatest for the fuel in the corner fuel element of the fuel assembly adjacent the control rod and the effect becomes more pronounced the longer the control rod remains adjacent the fuel. The control rod history effect is greatest for designs in which there are no followers on the control rods.

Another phenomenon prevalent in boiling water reactors is "axial steam void suppression." In such reactors, boiling of the coolant within individual channels causes a negative power feedback because the local reactivity of the fuel decreases with increasing steam voids. If a control rod is partially inserted in the bottom of a channel it suppresses the boiling near the control blade thereby causing a corresponding reduction in steam voids in the higher reactivity regions above the control blade. The reduced boiling above a partly inserted control rod can cause severe power peaking which can exceed the magnitude of the power in a channel with the control rod flully withdrawn.

Early in the design and operation of nuclear power reactors of the type under discussion, procedures and patterns for control rod insertion and withdrawal were developed. The basic approach has been to attempt to distribute the fuel burn-up, plutonium production and control rod history effects as evenly as possible among the fuel assemblies of the core by periodic revision and interchange (swapping) of control rod patterns.

In known control rod operating procedures, for reactors of the type described, the control rods are arranged in several alternating patterns which permit one group of control rods to be swapped for another during operation. These usually consist of two, three or four patterns of control rods which alternatively are inserted in the reactor core for power shape and burnup reactivity control.

In accordance with the known control rod operating procedures the core is operated with a given control rod pattern for a period of energy generation. Power is then reduced and the given pattern is exchanged or swapped for another pattern, etc. Thus, there may be from five to eight control rod pattern changes in an annual reactor operating cycle. Such control rod patterns and pattern swapping are discussed in greater detail in U.S. Pat. No. 3,385,758.

The known control rod operating procedures cause most of the fuel to experience adjacent control rod movement at power during the residence time of the fuel in the core of about four years. Such control rod motion results from burn-up control, control rod pattern swaps, load following, xenon transient control, fuel conditioning, etc. These operating variables cause the total number of control rod movements which the fuel experiences to be undesirably large. Furthermore, control rod pattern swaps excite spatial power distribution xenon transients and control rod motion constraints due to thermal, hydraulic, safety and fuel conditioning limits make reactor operation undesirably complex and increase the probability of operator error. Thus, the known operating procedures tend to decrease thermal and safety margins, increase manufacturing complexity, decrease capacity factors and increase the risk of fuel damage.

A summary of the observed problems with the known BWR operating methods which interchange or swap control rod patterns is as follows:

(1) The reactor power must be reduced to perform the swaps while conforming to PCI constraints. In many cases as many as five days are required to return the reactor to full power after the swap, thus reducing reactor capacity factor.

(2) The swaps complicate design and operations. Because of the desirability of performing control rod swaps when power is reduced for some other reason, reactor operations are difficult to plan and similar reactors are operated differently through a fuel cycle interval.

(3) The control rod swaps and associated power reductions cause spatial and non-spatial xenon transients which complicate reactor operations and contribute to difficulty in conforming to PCI limits.

(4) The reactor operator learning curve is extended by the complicated, interacting three space dimensional variables and constraints. This increases the possibility of operator errors which would violate PCI or other constraints.

(5) All fuel except that located at the periphery of the core experiences large increases in linear power due to adjacent control rod motion during the fuel cycle interval between refuelings. The core periphery usually is the only area where fuel can be located such that it will not experience adjacent control rod motion.

(6) All control rods, except those located near the core periphery, must serve the dual functions of power shaping-burnup reactivity control and reactor shutdown. Therefore, any unique specialized design characteristics required for these different functions cannot easily be incorporated in the control rod and control rod drive designs.

(7) Application of automatic power distribution spatial shape control for load following or other purposes is greatly complicated by the large number of variables and their complex interaction. Furthermore, the following disadvantages from locating control rods adjacent to high power or high reactivity fuel or adjacent to fuel containing undepleted burnable absorber have been observed:

Low steam void water above partially inserted control rods frequently cause the peak local reactor power to be reached in such regions. Thermal limits such as the transition or departure from nucleate boiling limits also are affected adversely by partial control rod insertion adjacent to high reactivity fuel.

Control rods inserted adjacent to fuel containing undepleted burnable absorber tend to skew the burnup of the absorber and causes an undesirable burnable absorber spatial transient that increases peak local power in the reactor or requires that the fuel be designed and fabricated with complicated burnable absorber shapes.

It is an object of this invention to provide a fuel design, fuel arrangement and reactor operating methods which simplify reactor core operation. More specific objects of the invention are to minimize control rod movement throughout an operating cycle, maintain low reactivity fuel adjacent to inserted control rods, separate the control rod functions into power shaping-burnup control and shutdown functions, increase reactor capacity factors, increase fuel reliability, improve fuel cycle economics, increase thermal margins, increase the feasibility of automatic spatial power shape control and improve load following capability.

SUMMARY

These and other objects of the invention are achieved by separating control rod functions into power shaping-reactivity control and shutdown functions and by maintaining low reactivity or specially designed fuel in the control cells where the power shaping-reactivity control control rods are inserted at power.

In the initial core the control cells are fueled with fuel assemblies of special design having relatively low enrichment. The non-control cells are fueled with specially designed fuel assemblies of relatively greater initial enrichment which are capable of being located in the control cells during subsequent fuel cycle intervals. As the reactor is started up and brought to rated power the control rods of the non-control cells are substantially completely withdrawn and thenceforth throughout the operating cycle the reactor is controlled only by the control rods of the control cells. Thus only the specially designed low enrichment fuel of the control cells experiences control rod motion adjacent thereto during the cycle. By this approach, core operation is greatly simplified and the many problems of control rod swapping are avoided.

At the end of an operating cycle the reactor is shut down for refueling and the fuel assemblies of the control cells normally are discharged (removed from the reactor) or moved to the peripheral fuel assembly portions of the reactor core. Irradiated fuel assemblies from outside the control cells with lowest reactivity are inserted in the control cells. Fresh (i.e., unirradiated) fuel assemblies are inserted outside the control cells (i.e., in non-control cells) away from the control rods which are to be inserted at rated power.

Fuel resides in the core for n cycles of operation of the core (where n typically is four). The fuel assemblies typically reside in the non-control cells for n−1 cycles of their residence time in the core (although they may be moved from one position to another within the non-control cells), they are moved into control cells for their last cycle of residence time in the core and they are then discharged from the core or moved to the core periphery. For some applications, unirradiated, specially designed, high reliability fuel can be inserted directly in the control cells on other than the first cycle where it resides for m cycles, with m being the same as or different from n (the number of cycles of residence of non-control cell fuel.) Such a core design embodying separation of control rod function and location of only low reactivity fuel adjacent the power shaping-reactivity control control rods according to the invention is called a "control cell core."

The shutdown control blades of the non-control cells are withdrawn at power and suffer reduced burn-up and irradiation damage and stresses, therefore these control blades have a long lifetime. Thus it is feasible to use more expensive control materials therein, particularly in the upper portion thereof, to maximize cold shutdown worth and improve the reactor's fuel cycle burnup capability. Also, the drives of the control rods of the non-control cells can be relatively simple and inexpensive.

On the other hand, since the control rods located in the control cells comprise only about one-quarter of the control rods of the core, it is feasible to optimize the drives and control rods of the control cells in view of their primary use for power shaping and burnup reactivity control. Such optimization includes the provision of fine motion drives and grey tip (tapered control worth) control blades. Both of these features advantageously provide a more gradual change in power in the adjacent fuel when the control rod is moved. The fine motion drives, which are expensive and complex, feasibly may be limited to use at only the control cell positions. Also, it becomes feasible to use alternate control blade materials which provide a greater lifetime and more favorable neutron absorption spectrum. For example, long lifetime hafnium control materials reduce the power perturbation of the power shaping blades and extend the lifetime of these blades.

The maximum performance capability improvements of the control cell core are made feasible by appropriate design of the fuel assemblies for insertion in the control cells, usually for the last or next to last fuel cycle interval prior to discharge from the core. Optimal fuel assembly designs are desirable to provide for the control history effects and the associated period of fuel burnup during which the control history effects occur.

For an initial core, the fuel assemblies which are to reside in the control cells are particularly designed for that purpose. Also, the design of the fuel assemblies which are to be moved into the control cells during the first refueling is different from the design of the fuel assemblies that are to be moved into the control cells at subsequent refuelings. In other words, the fuel assemblies are particularly designed depending upon their position in the core and their anticipated residence time therein.

Reload fuel assemblies usually are not moved into the control cells until their third or fourth cycle of residence in the core and the burnable absorber design of such reload fuel usually is different than that of the initial core fuel. Consequently, the reload fuel assemblies also can be designed optimally to provide maximum benefits from the separation of control functions.

Specially designed fuel assemblies may be used in the control cells since, in many applications, only about one-half of the fuel resides in control cells during its history in the core. Such specially designed fuel assemblies may be introduced in the control cells in its first, second, third, fourth or fifth cycle of residence and in some cases may be left in the control cells for more than one cycle. However, in the usual optimal application, fuel will reside in the control cells only on its last or next to last cycle of residence in the core.

Manufacturing criteria require that fuel elements of standard design be used to fabricate the fuel assemblies and that the number of different standard fuel element types be minimized. Therefore, the fuel assemblies are designed to employ in common as many of the standard fuel elements as possible while satisfying design, performance and safety objectives.

The initial and coupled reload fuel assembly designs for the control cell core make feasible the achievement of these objectives including the reduction in the number of standard fuel element types that must be used for fabrication of the required fuel assemblies.

The unique aspects of the control cell core design, which avoids location of fuel assemblies containing undepleted burnable absorber adjacent to inserted control rods at power, make it feasible to simplify the design of the burnable absorber bearing fuel elements in the fuel assemblies by reducing the number of different axial zones of burnable absorber in these fuel elements.

Alternative patterns of control cells can be used depending on specific core requirements and reactor design. The primary criterion is that the pattern of control cells provide maximum core symmetry and that sufficient control cells be present to provide for ease of reactor startup, for control of power shape and maximum excess reactivity, and for load following on the utility grid. The number and position of the control cells may be revised at the beginning of a new fuel cycle interval where there are performance or other advantages to do so.

The separation of control functions and the unique core design makes possible the application of basic criteria that (1) fuel containing undepleted burnable absorber will not be located adjacent to control rods at significant power, (2) high reactivity fuel will not be located adjacent to control rods at steady state rated power, (3) control rod pattern changes and control rod movement will be minimized within a fuel cycle interval, (4) fuel which experiences large power changes due to adjacent control rod movement will be maintained at relatively lower power when the control rod is withdrawn, (5) control rod cold shutdown reactivity will be maximized in the local regions of highest reactivity and the effects of control rod burnup on cold shutdown control will be minimized, and (5) perturbation of the local and global power by the control rods used for power shaping at rated power will be minimized and control blade lifetime will be maximized for the control blades which accumulate significant neutron exposure at power.

Application of these principles to the control cell core design results in greater thermal margins, increased plant capacity factors, simpler reactor operations, reduced probability of operator error and improved safety, improved fuel reliability, improved fuel cycle economy, simplified fuel manufacturing, and improved load following rate and range. Furthermore, the reduced number of control rod pattern variables simplifies design and increases the capability for applying fully automatic, direct power shaping control.

DRAWING

FIGS. 6A-6C are schematic plan views illustrating example refueling of equilibrium core designs;

FIGS. 9A-9D illustrate an example control rod and drive for use in the control cells of the core; and FIG. 10 illustrates an example control rod and drive for use in the non-control cells of the core.

GENERAL DESCRIPTION

Figure 1:
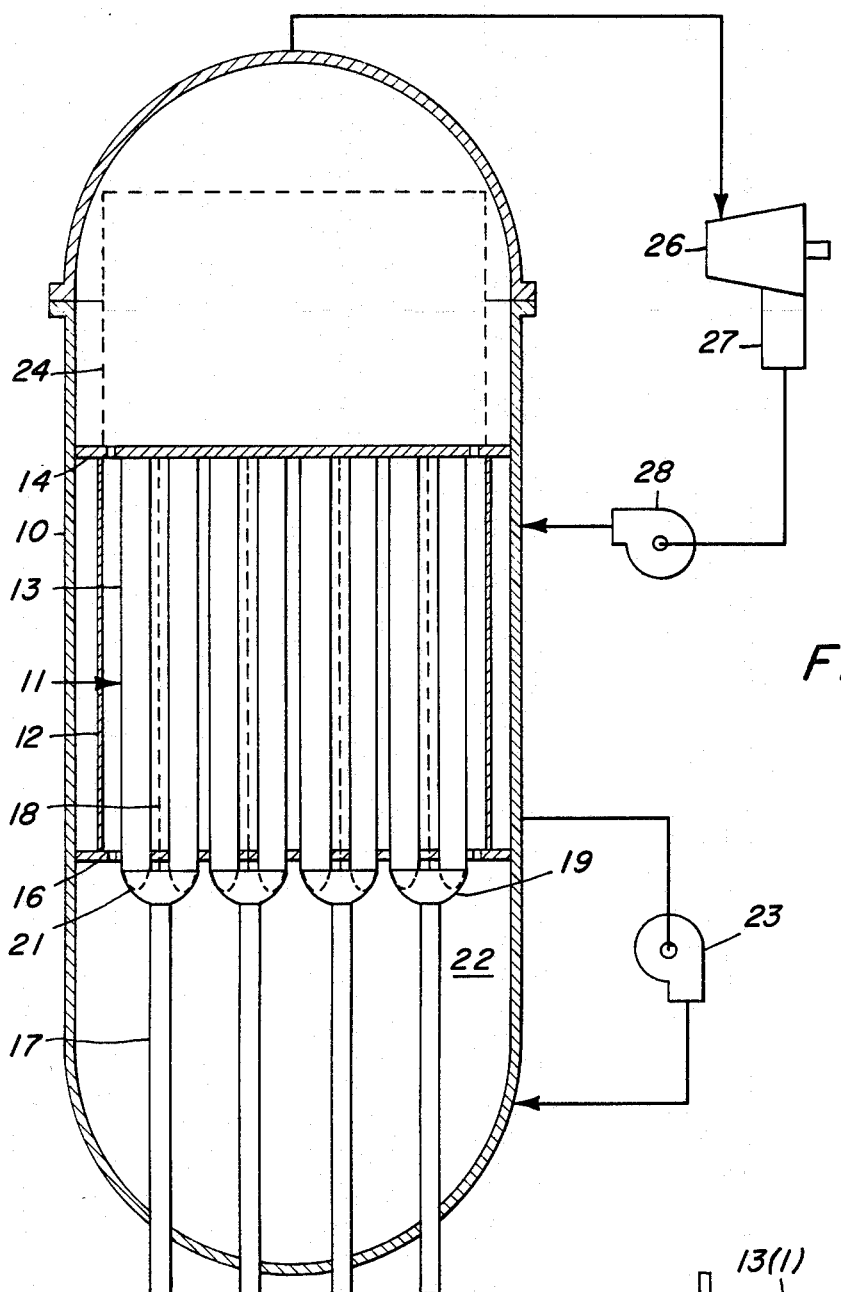
FIG. 1 is a schematic illustration of a water cooled and moderated nuclear reactor steam supply system.

Although not limited thereto, the invention is described herein as employed in a water cooled and moderated nuclear reactor of the boiling water type, an example of which is illustrated in simplified schematic form in FIG. 1. Such a reactor system includes a pressure vessel 10 containing a nuclear reactor core 11 submerged in a coolant-moderator such as light water. The core 11, which is surrounded by an annular shroud 12, includes a plurality of replaceable fuel assemblies 13 arranged in spaced relation between an upper core grid 14 and a lower core plate 16.

A plurality of control rod drive housing tubes 17 house control rod drives by which a plurality of control rods 18 are selectively insertable among the fuel assemblies 13 for control of the reactivity of the core. Each of the housing tubes 17 is fitted with a fuel assembly support member 19 each of which is formed with sockets for receiving the nose pieces 21 of four adjacent fuel assemblies. The nose pieces 21 and the support members 19 are formed with coolant passages or openings for communication with a coolant supply chamber 22. A coolant circulation pump 23 pressurizes the coolant in the supply chamber 22 from which the coolant is thus forced through the openings in support members 19 and the fuel assembly nose pieces upward through the fuel assemblies. A part of the coolant is thereby converted to steam which passes through a separator-dryer arrangement 24 to a utilization device such as a turbine 26. Condensate formed in a condenser 27 is returned as feedwater to the vessel 10 by a pump 28.

Figure 2:
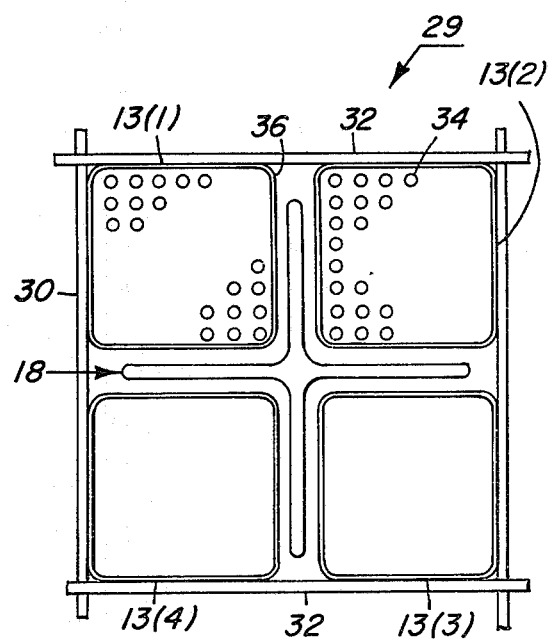
FIG. 2 is a schematic plan view of a fuel cell of a core.

Each control rod 18 and the surrounding four fuel assemblies comprise a fuel cell of the core. A typical such cell 29 is shown in plan view in FIG. 2 wherein the four fuel assemblies 13(1)-13(4) surrounding the control rod 18 are laterally supported at their upper ends in an upper core support grid formed by intersecting and interlocking beams 30 and 32.

Each of the replaceable fuel assemblies 13 is formed of a plurality of elongated fuel elements 34 supported in spaced relation between upper and lower tie plates (not shown) and surrounded by a tubular flow channel 36 which directs the coolant upward among the fuel elements. More detailed illustration of such a fuel assembly may be found in the previously mentioned U.S. Pat. No. 3,689,358.

A reactor of the type described is refueled periodically with a partial batch of fuel which comprises some part of the core. Typically the reactor is operated for 12 to 18 months between refuelings, depending on the fuel enrichment, refueling batch size and utility grid requirements. These intervals of operation between refuelings are called "fuel cycles" or "cycles of operation."

Figure 3A:
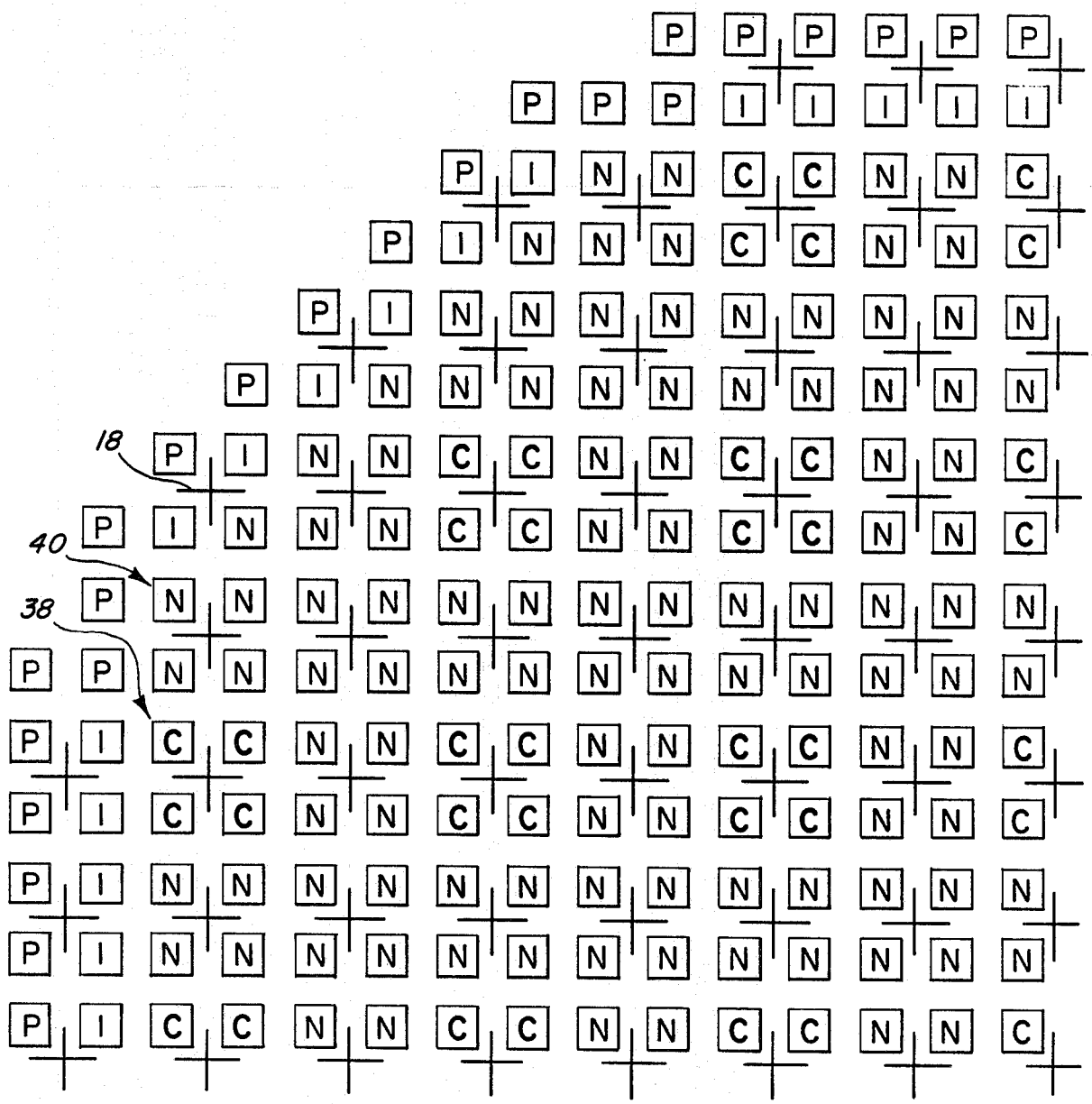
FIG. 3A is a schematic plan view of one-quarter of a core illustrating one possible control cell arrangement.

In accordance with the invention the fuel cells of the core are arranged in a pattern of control and non-control cells, the control cells being separated from one another by at least one non-control cell. Two possible such patterns are illustrated by the plan views of symmetric quadrants of example cores shown in FIGS. 3A and 3B wherein the fuel assemblies of control cells 38 are designated "C" and the fuel assemblies of non-control cells 40 are designed "N". Both of the patterns are ⅛ core symmetric with a different pattern of control cells relative to the center of the core. (Core symmetry is a desirable but not a required feature of the control cell core arrangement herein described.) The control cells may increase or decrease in number or change from one pattern to another between fuel cycles. For example, the pattern of FIG. 3A could be used during one typical one-year fuel cycle with the control cells relocated to the positions of FIG. 3B for the following one-year fuel cycle.

The periphery of the core can be considered a special region characterized, for example by high thermal neutron flux gradients. To facilitate identification of the fuel assemblies advantageously used in this region the peripheral fuel assemblies are designated "P" and the fuel assemblies adjacent thereto are, in general, designated "I".

It is noted that for convenience of illustration only one quadrant of the core is shown but, assuming the core to be symmetrical, the showing of one quadrant is sufficient to define the entire core arrangement.

Further in accordance with the invention the control cells (hereinafter C cells) 38 are fueled with fuel of relatively low reactivity while the non-control cells (hereinafter N cells) 40 are fueled with fuel of relatively high reactivity. For example, (depending on the requirements of a specific case) the C cells may have a reactivity at the beginning of an operating cycle equivalent to a fresh fuel enrichment of from about 0.711–1.2 w/o (weight percent fissile) a typical value being 0.924 w/o for an initial core and the N cells may have a reactivity equivalent to a fresh fuel enrichment of from about 1.6 –2.7 w/o or an average value in the order of 2.15 w/o. The ratio of the fissile material in the N cells to that in the C cells is generally maximized, consistent with design, operational and fuel cycle constraints.

Additionally, the peripheral fuel assemblies P are advantageously fueled with low reactivity fuel, for example equivalent to the fresh fuel enrichment of natural uranium (0.711 w/o), while the adjacent intermediate fuel assemblies I are fueled with high reactivity fuel, for example, equivalent to a fresh fuel enrichment of about 3 w/o. This use of the combination of low reactivity peripheral fuel and high reactivity adjacent intermediate fuel minimizes neutron leakage from the core while flattening the core radial power distribution and improving margins relative to thermal performance limits.

With the fuel thus arranged, in accordance with the invention, as the reactor is brought to power from shutdown, the control rods of the N cells and from around the periphery are withdrawn from the core and thenceforth throughout the operating cycle only the control rods of the C cells are used for control of the power level and distribution. The operating strategy for the control rods of the C cells depends, among other things, upon the reactivity distribution of the fuel in the adjacent N cells. (Example operating strategies for the control rods of the C cells through an operating cycle are presented hereinafter.) A general strategy of reactor operation has been described by R. L. Crowther in a paper entitled "Burnup Analysis of Large Boiling Water Reactors," Proceedings of IAEA Panel, Vienna 1967, International Atomic Energy Agency (1968). The equal burnup-power end-of-cycle state described therein is called the "Haling Distribution."

After a reactor core has been in operation a sufficient number of uniform repeating operating cycles it tends to reach an "equilibrium" with respect to the number of enrichment of the replacement fuel assemblies and their distribution in the core. Thus, such a core may be called an equilibrium core and the cycles of operation thereof equilibrium cycles. Typically, an equilibrium core is refueled approximately annually with replacement of in the order of one-quarter of the fuel assemblies. Thus, a fuel assembly for an equilibrium core resides in the core for about four years with a typical discharge exposure of in the order of 26,000 Mwd/ST (Megawatt days per standard ton).

In an equilibrium core, in accordance with the invention, the fuel assemblies of greatest burnup or lowest reactivity of the N cells are used in the C cells for the last cycle of residence of such assemblies in the core. The N cell fuel, in this application, is particularly designed to permit its location in the C cells during its last cycle and to provide maximum thermal margins and fuel reliability. In an alternative implementation of the invention, special fuel assemblies are loaded in the C cells either as fresh fuel or after residence in some of the N cells for one to three fuel cycles.

In practical utility operation, a reactor only infrequently reaches true "equilibrium." Therefore, practical reactor core design requires the capability for adjustment of the reactivity, refueling batch size, control rod patterns and reactor operating modes to accommodate realistic variations in reactor operating conditions. This is accomplished according to the invention by maintaining a repeating array of control cells and non-control cells in the central portions of the reactor core, a low reactivity peripheral zone to minimize neutron leakage from the core and an intermediate zone between the central and peripheral zones which may vary in the number of fuel assemblies and volume.

Thus the number of C cells may vary from one fuel cycle to another. Additional flexibility is provided through the capability to refuel with more than one type of fuel assembly. The fuel assemblies inserted during any refueling can vary in type, average enrichment, burnable absorber content or in any other design characteristics and also can consist of fuel discharged from a prior refueling.

However, in a new reactor, just being brought on-line, all of the fuel of the core usually is fresh. Fuel assemblies for use in such an initial core may be designed and arranged to, in effect, simulate an equilibrium core whereby transition from the initial to equilibrium core is facilitated. Application of the present invention to initial and transition cycle operation will now be described.

FIGS. 4A–4G illustrate an example core configuration and example fuel assemblies for use therein in an initial core.

Figure 4A:
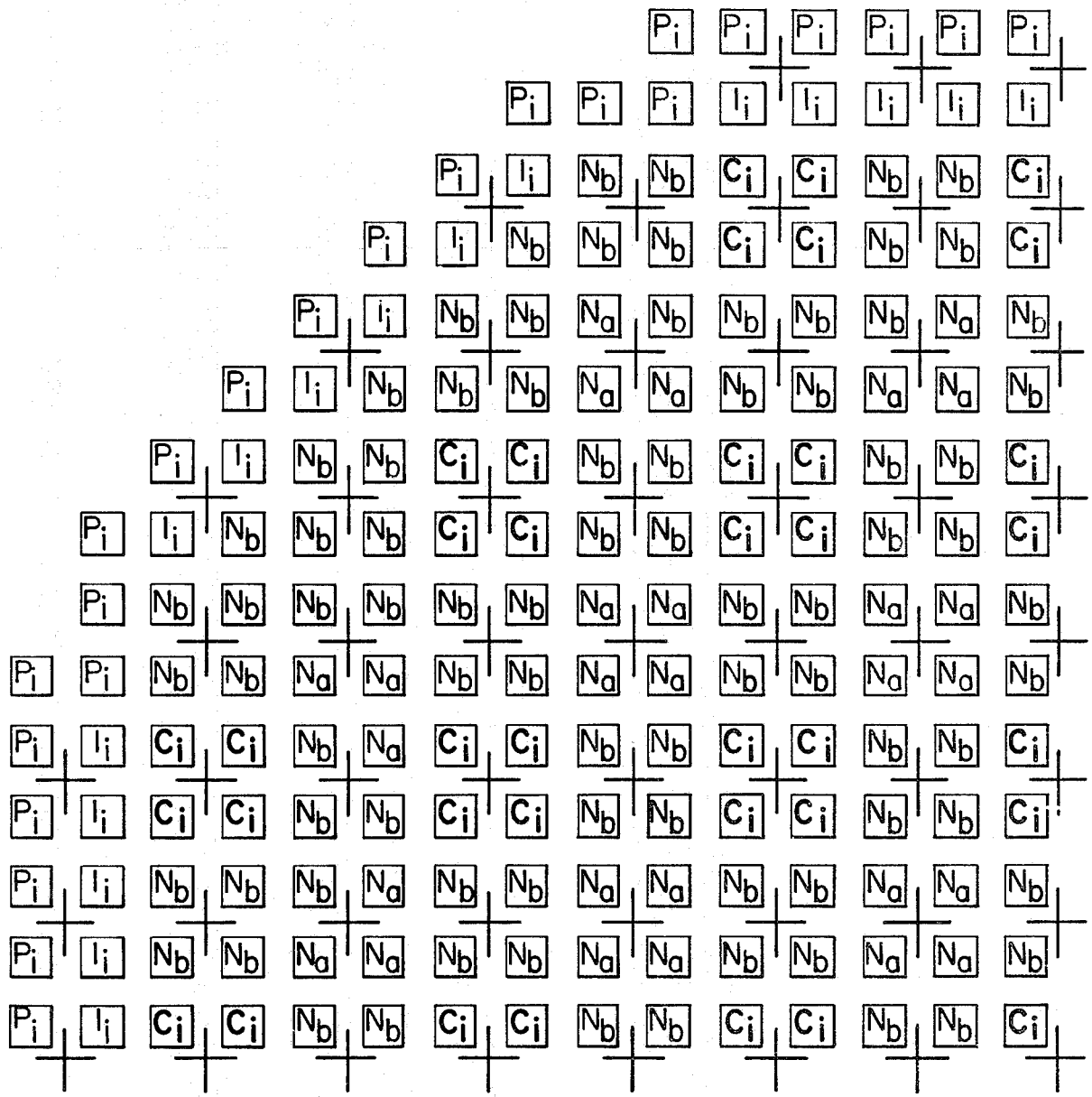
FIG. 4A is a schematic plan view illustrating a control cell core arrangement for an initial core.
Figure 4B:
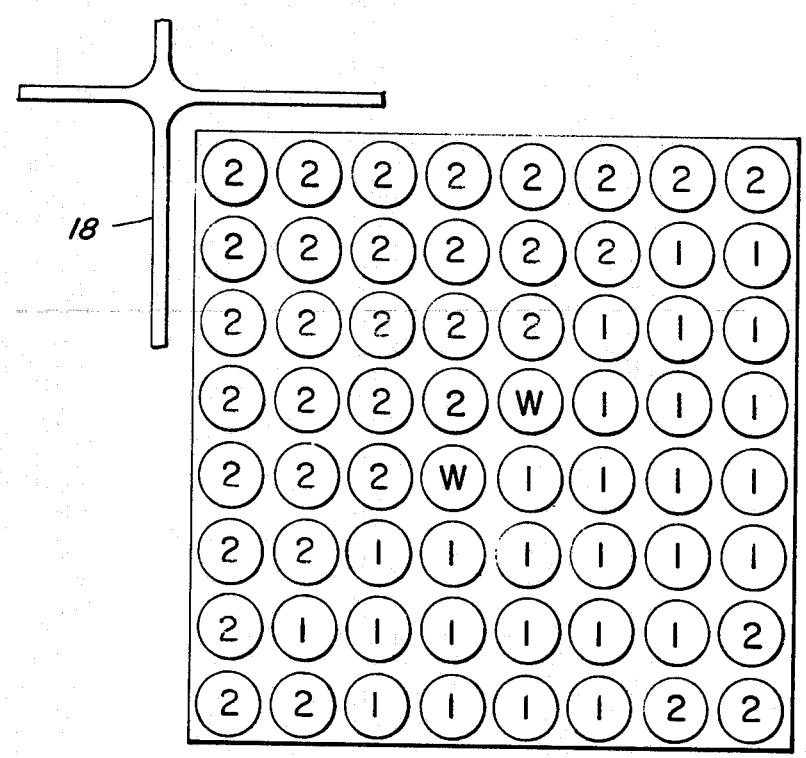
FIGS. 4B-4F illustrate arrangements of example fuel assemblies for use in the core of FIG. 4A.
Figure 4C:
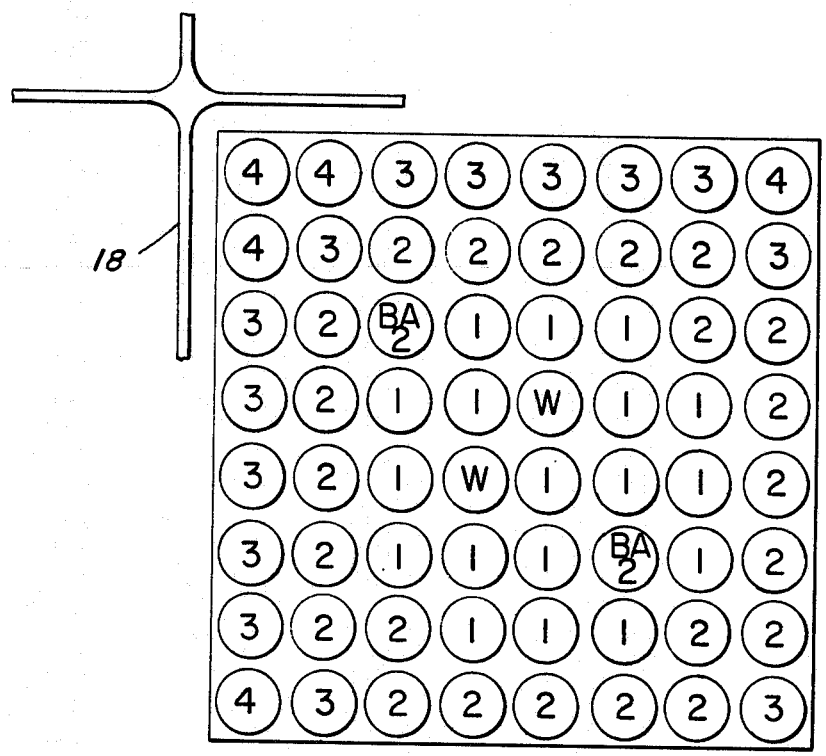
Figure 4D:
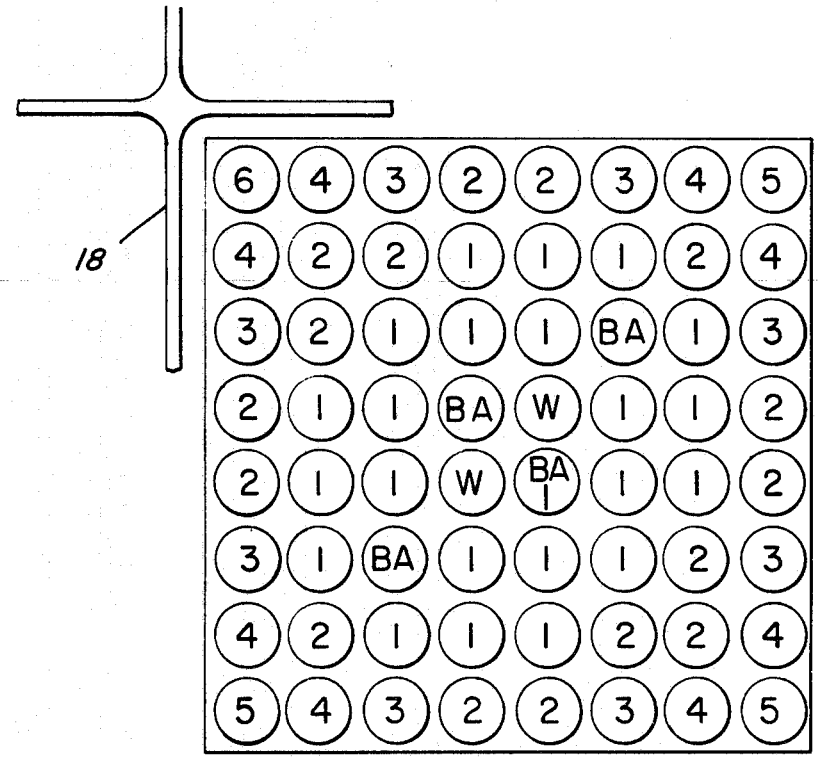
Figure 4E:
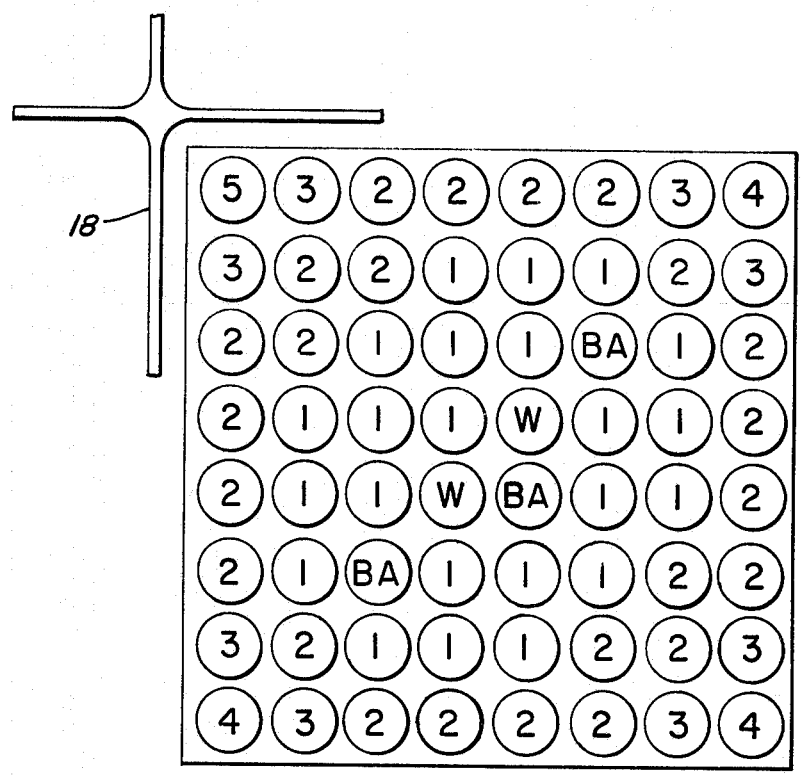
Figure 4F:
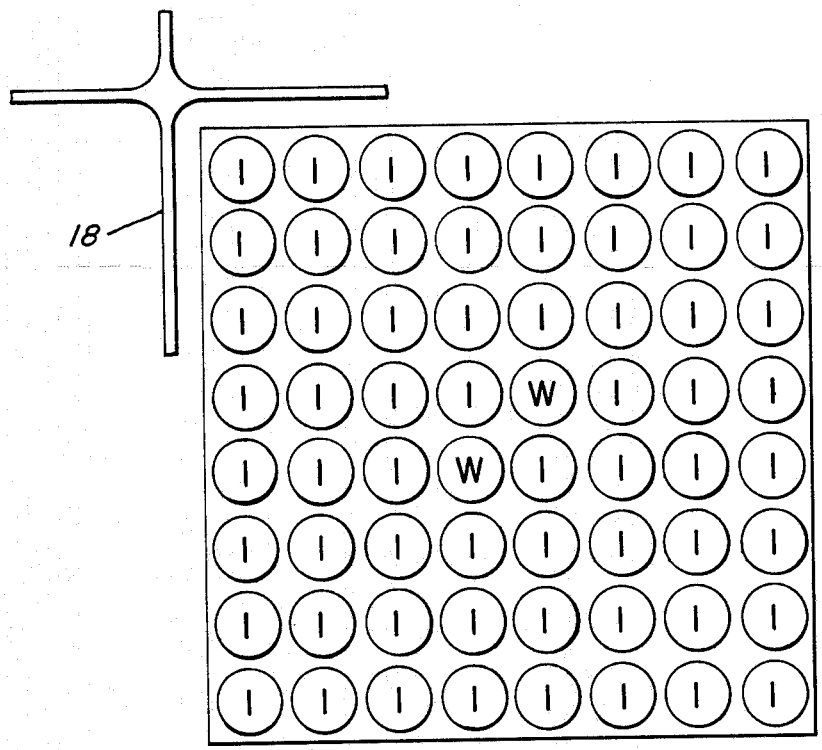
Figure 4G:
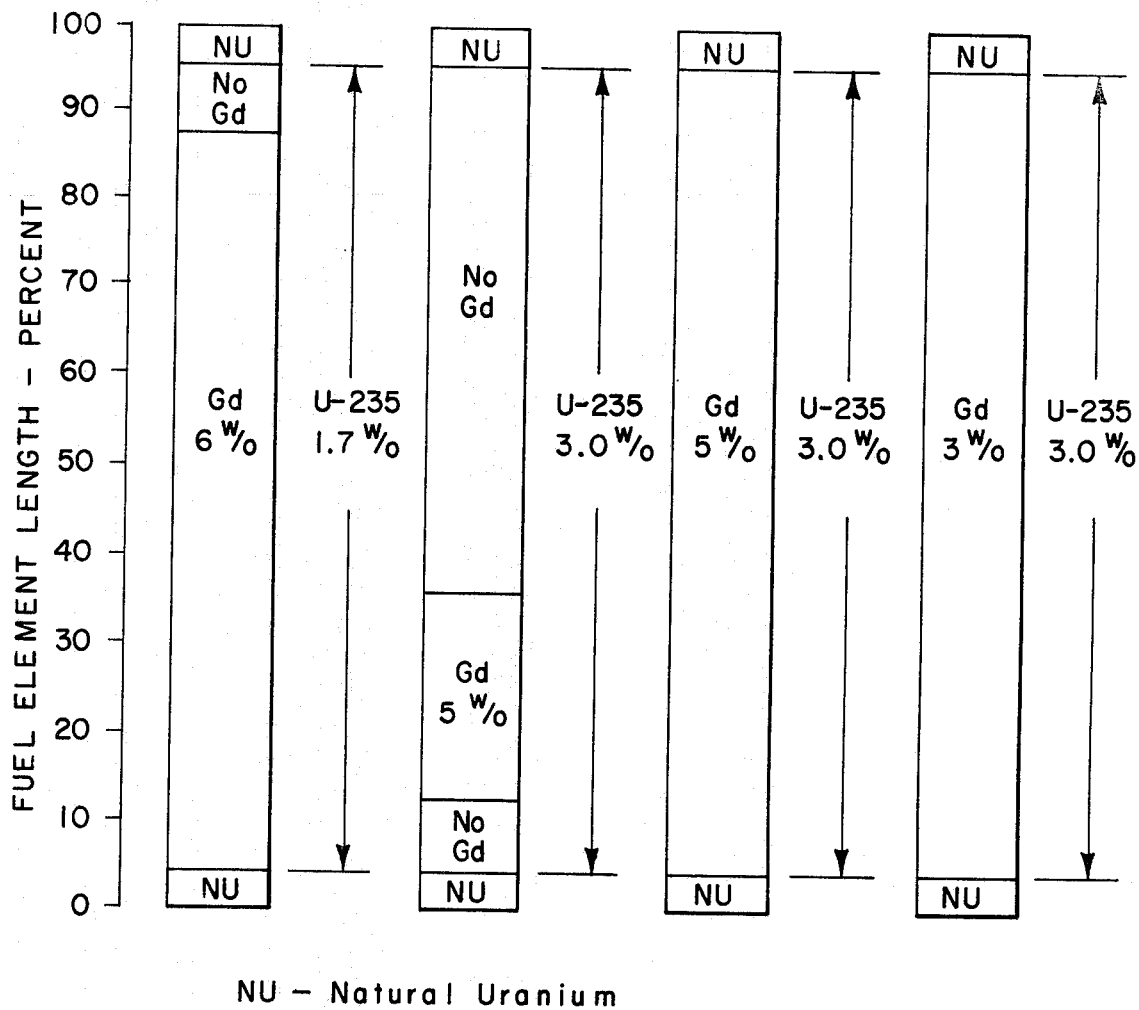
FIG. 4G illustrates example burnable absorber distributions in the fuel elements.

The initial core configuration as illustrated in FIG. 4A utilizes several different fuel assembly types $C_i$, $N_a$, $N_b$, $I_i$ and $P_i$ as illustrated in FIGS. 4B–4F, respectively. In FIGS. 4B–4F the fuel element positions legended W are occupied by non-fueled tubes having lower and upper openings by which the water-moderator flows therethrough (as discussed, for example, in U.S. Pat. No. 3,802,995). In FIGS. 4C, 4D and 4E the fuel elements legended BA contain a burnable absorber such as gadolinium mixed with portions of the fuel material. Example axial distributions of such burnable absorber are shown in FIG. 4G. Such simple burnable absorber arrangements are feasible in the control cell core and its operation according to the invention because in such an arrangement the control rods are not inserted at power adjacent fuel assemblies containing significant unburned burnable absorber. Thus power distribution perturbations caused by control rods and their interaction with burnable absorber burnup are avoided. Also as indicated in FIGS. 4C and 4D certain of the fuel elements may or may not contain burnable absorber depending upon the requirements of the particular core and upon the position of the fuel assembly in the core.

The fuel assemblies $C_i$, $N_a$, $N_b$, $I_i$ and $P_i$ are arranged in the configuration of FIG. 4A in a manner to maximize the full power capability of the core throughout the initial operating cycle while satisfying design safety constraints. The peripheral zone, about one-eighth of the core volume, is fueled with the low enrichment assemblies $P_i$ (FIG. 4F) to minimize neutron leakage from the core. The high enrichment fuel assemblies $I_i$ (FIG. 4E) positioned adjacent to the peripheral assemblies aid in flattening the core radial power distribution for improved thermal performance.

The fuel assemblies $C_i$ (FIG. 4B) are designed for use in the C cells throughout the initial operating cycle. In addition to low average enrichment the enrichment distribution of the fuel elements of the assembly is designed to locate the fuel elements of lowest enrichment in the fuel element locations closest to the adjacent control rod. The distribution of the fuel elements is optimized to accommodate long periods of power operation with the control rod inserted adjacent to the fuel. This arrangement enables the assembly to accommodate the necessary long periods adjacent to the inserted control rod blade followed by subsequent control rod withdrawal and associated local power peaking due to the history of prior control rod insertion. (It is noted that the fuel assembly $C_i$ can also be used as an alternative to the fuel assembly $P_i$ in the peripheral locations of the core.)

The fuel assemblies $N_a$, $N_b$ and $I_i$ are designed for initial residence in the N cells and eventual use in the C cells after they have accumulated sufficient exposure. For example, the fuel assemblies $N_a$ can be moved into the C cells for the second cycle, the assemblies $N_b$ for the third cycle and the assemblies $I_i$ for the fourth cycle. Among the design features of these assemblies which permits such use is the unique distribution of fuel enrichment which provides for last cycle operation with control rods inserted for long periods of operation.

In an alternative scheme, new (unirradiated) $C_i$ type assemblies can be loaded into the control cells each refueling cycle. The fuel elements of these assemblies may be designed with special protection from the large power changes which occur from adjacent control blade movement, for example, with cladding barriers as described in U.S. Pat. No. 3,925,151.

As mentioned hereinbefore operation of the control cell core involves withdrawal of all control rods except those of the C cells as the reactor is brought to power. Operation at power is then controlled by the control rods of the C cells. The operating strategy of the C cell control rods can be quite simple, especially as compared to prior control rod operating strategies.

The unique pattern of fuel assemblies shown in FIG. 4A also provides ease of reactor startup and flexibility of operations. The next lowest reactivity fuel assemblies $N_a$ (FIG. 4C) are located in ⅛ core symmetric alternative control cell positions. During startup the control rods at the $N_a$ positions are used to partially control steam void, Doppler and Xenon reactivity and are the last group of control rods to be withdrawn prior to use of the control rods only at the $C_i$ positions to thereafter control the core operation. This minimizes local power beyond the tips of control blades which are moved at low reactor power and further facilitates rapid and reliable reactor startup.

During the subsequent refueling cycle, the position of the control cells ($C_i$) can be changed to the $N_a$ positions with the fuel assemblies from the $C_i$ positions being discharged or moved to the peripheral positions $P_i$, the fuel assemblies in the $N_b$ positions moved to the $C_i$ positions and the fresh fuel assemblies located in the vacated $N_b$ positions.

On the next following fuel cycle the control cells revert to the $C_i$ positions shown in FIG. 4A. This coupled refueling and operating plan reduces the number of fuel assemblies that must be moved during a refueling. An integrated equilibrium refueling plan utilizing a similar strategy is discussed hereinafter.

Figure 5:
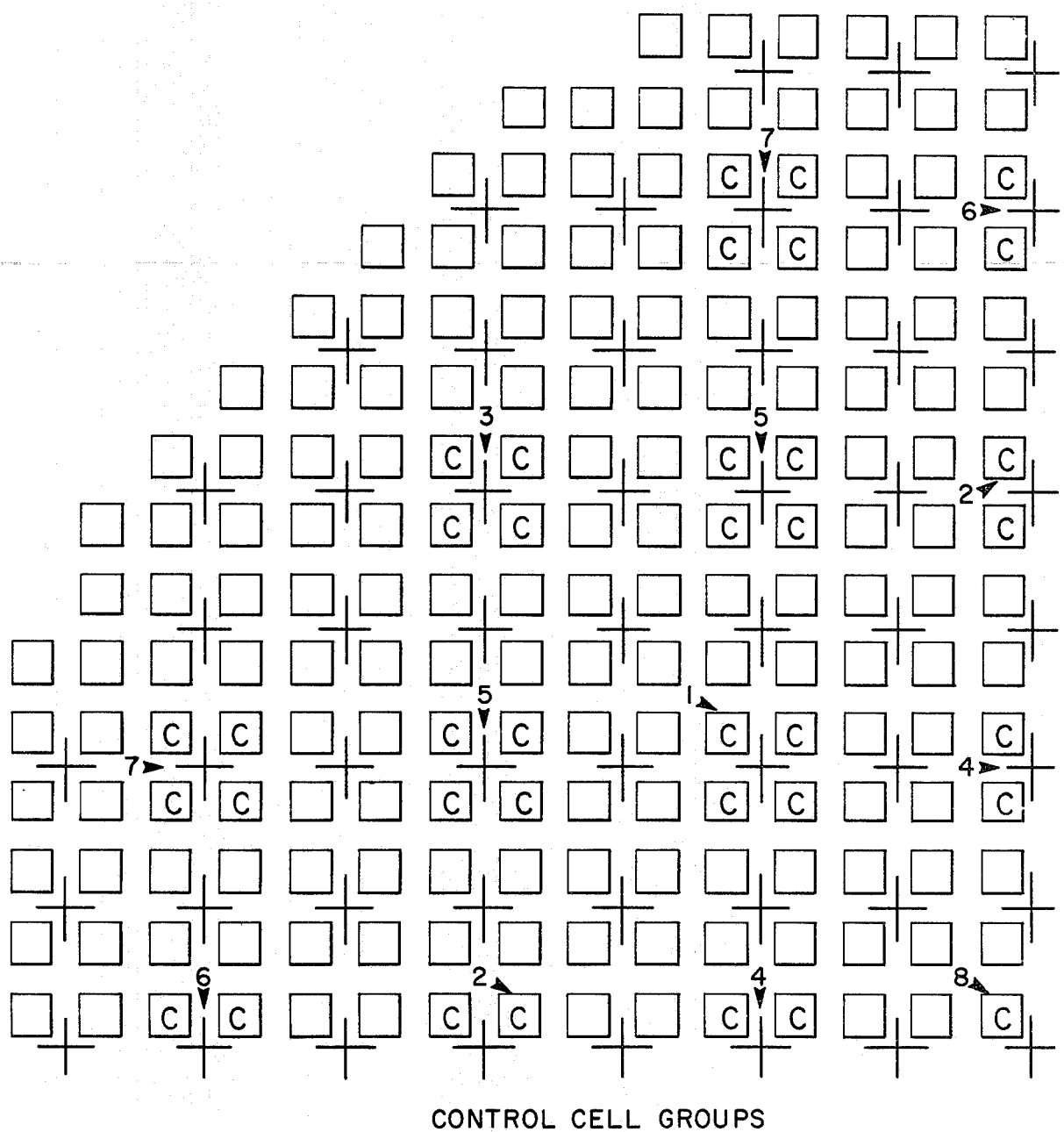
FIG. 5 illustrates group designations of the control rods of the control cells.

An example C cell control rod operating strategy is discussed in general terms with reference to FIG. 5 which illustrates the C cell control rods designated as members of eight groups thereof.

Using the group designations of FIG. 5 a typical selection of the C cell control rod patterns over the cycle is as follows:

(1) The control rods of groups 1, 2 and 8 are inserted to relatively deep positions. They are used to compensate for reactivity changes during the cycle until about one-third of their length is withdrawn from the core. They are then fully withdrawn from the core.

(2) The control rods of group 3 are inserted to intermediate positions and in relation to those of groups 1, 2 and 8 so as to make the core critical with a gross radial core power distribution peaked toward the center of the core and with a center peak of magnitude at least equal to that of the Haling burnup distribution previously mentioned.

(3) The control rods of group 7 are inserted from shallow to deep positions and they serve a dual role. They are used to shape the radial core power distribution during the portions of the cycle when the group 1 and 2 control rods are deeply inserted. Additionally, they provide the axial power shaping necessary to maintain acceptably limited power density in the neighboring high reactivity fuel assemblies adjacent the peripheral assemblies. Furthermore, during load following, startup and other conditions where operating flexibility is required, the group 7 control rods are deeply inserted such that upon partial withdrawal thereof the local power density in fuel near the blade tips is less than the pelletclad-interaction (PCI) threshold limiting power and, consequently, these control rods can be moved from their deep positions at rated power.

(4) The control rods of groups 4 and 5 are used only for axial power shaping during the part of the cycle when the group 1, 2 and 8 control rods are inserted. During this time they are inserted only as necessary to maintain acceptable power density margins in the adjacent high reactivity fuel assemblies. When the control rods of groups 1, 2 and 8 are fully withdrawn, the control rods of groups 4 and 5 are inserted to take over the role of reactivity control for the remainder of the cycle. This exchange of groups 1, 2 and 8 control rods with those of groups 4 and 5 sometimes is performed to minimize the peak power density in the C cell fuel assemblies. Since the C cell fuel assemblies in the cells of the groups 4 and 5 have no control rod history above their midplane at the time of the exchange, they have lower local power peaking than the fuel assemblies of the groups 1, 2 and 8 control cells would have had the exchange not been made.

(5) Finally, the control rods of group 6 are inserted only as necessary to maintain acceptable power density in the high reactivity assemblies or to provide deep control and full power operating flexibility similar to the application of the group 7 control rods, previously described.

At the end of an operating cycle the reactor is shut down for refueling. Normally the peripheral assemblies are discharged from the core. The C cell assemblies are removed from the C cells and are discharged from the core or, in some cases, these assemblies may be moved to the peripheral fuel assembly positions for an additional cycle of use in the core. The C cells are refueled with the highest burnup, lowest reactivity fuel assemblies from the N cells. (High burnup assemblies from the N cells also may be moved to the peripheral fuel assembly positions.) Fresh fuel assemblies are inserted into the N Cells (preferably in a scatter loaded manner), these fresh assemblies having an enrichment appropriate to providing the required reactivity throughout the next operating cycle.

Figure 6A:
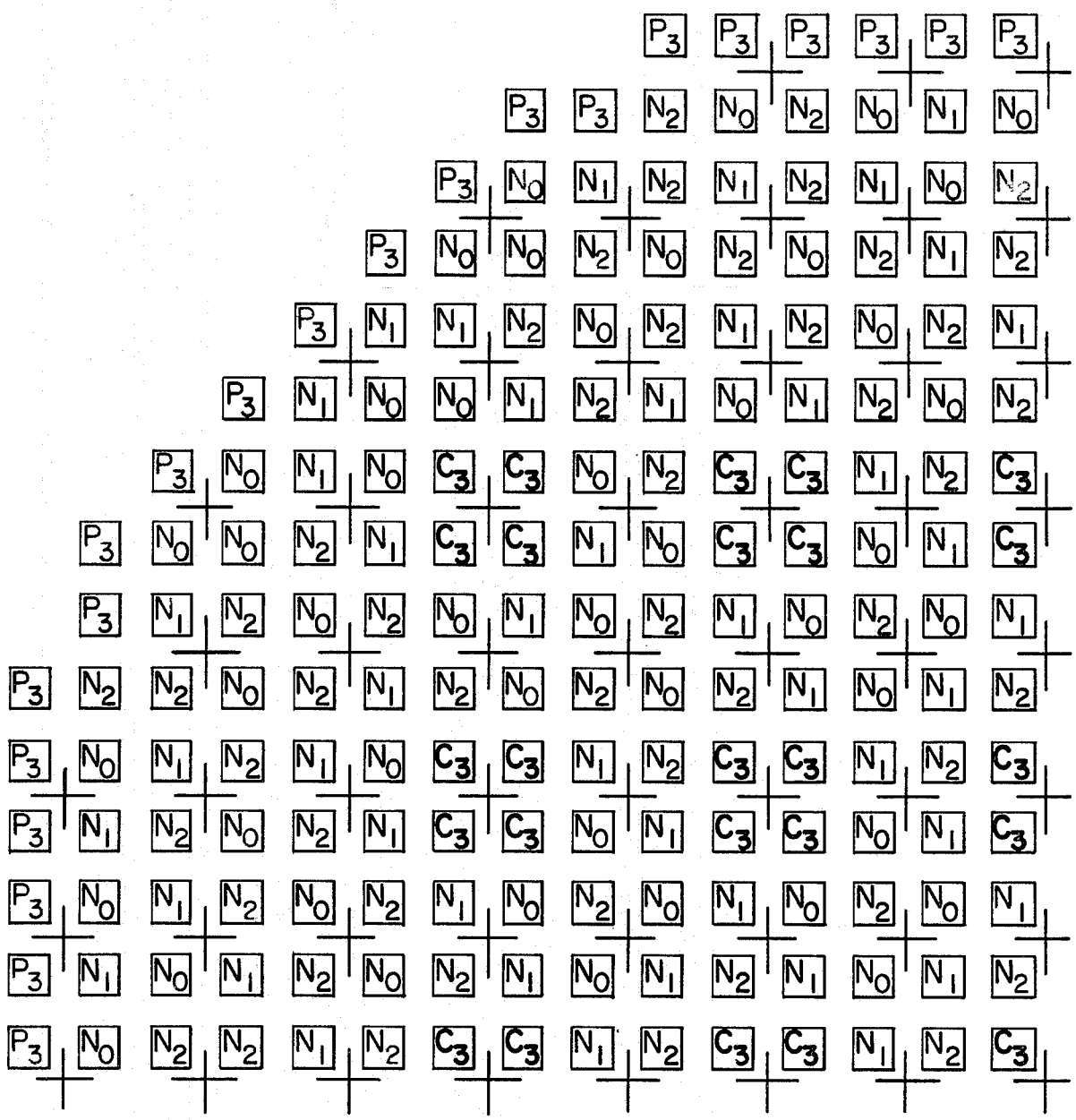

An example configuration of a refueled core in accordance with the invention is illustrated in FIG. 6A wherein the subscripts 0–3 of the fuel assembly legends indicate the number of cycles of exposure of the fuel at the time of this refueling.

An alternative pattern which provides a distribution of reactivity similar to the initial core design of FIG. 4A is shown in FIG. 6B. The fifth cycle fuel on the periphery ($P_4$ positions) usually is fourth cycle peripheral fuel from a prior cycle but also can be fuel moved from the control cell positions. This pattern can be repeated at equilibrium by discharging the $P_4$, $C_3$ and/or $P_3$ fuel assemblies, moving the $N_2$ and/or $C_3$ fuel assemblies to the P positions, moving $N_2$ fuel assemblies to the $C_3$ positions, moving the $N_1$ fuel assemblies to the previous $N_2$ positions, and loading fresh fuel in the vacant $N_1$ positions.

Figure 3B:
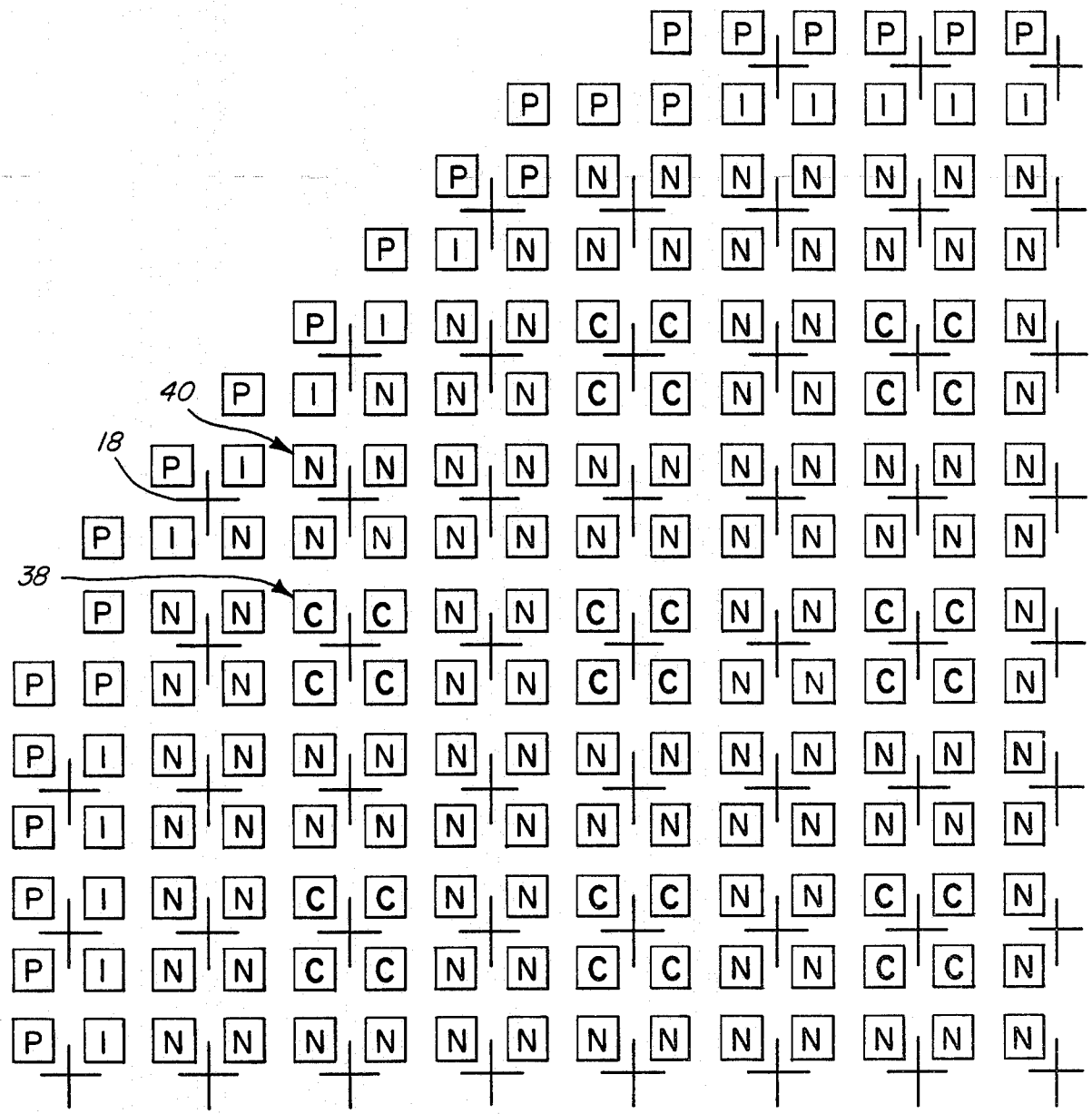
FIG. 3B is a schematic plan view illustrating an alternate control cell arrangement.

FIG. 6C illustrates an alternative loading pattern similar to that of FIG. 6B except with the control cells located in different locations with respect to the center of the core, similar to the core arrangement of FIG. 3B. To be noted is that the control cells of the arrangement of FIG. 6C are in the same locations as the cells of $N_2$ fuel in the arrangement of FIG. 6B.

Since the $N_2$ fuel assemblies are scheduled to be used in the control cells for their last cycle, the number of fuel assemblies that must be moved during refueling can be minimized by alternating from the control cell pattern of FIG. 6B on one fuel cycle to the pattern of FIG. 6C on the next fuel cycle, to the pattern of FIG. 6B on the following fuel cycle, and so on. This alternative spreads the use and burnup of the control blades over a greater number of control rods and thus requires about twice the number of special function, long lifetime control rods for power shaping and reactivity control within the control cells.

Figure 7:
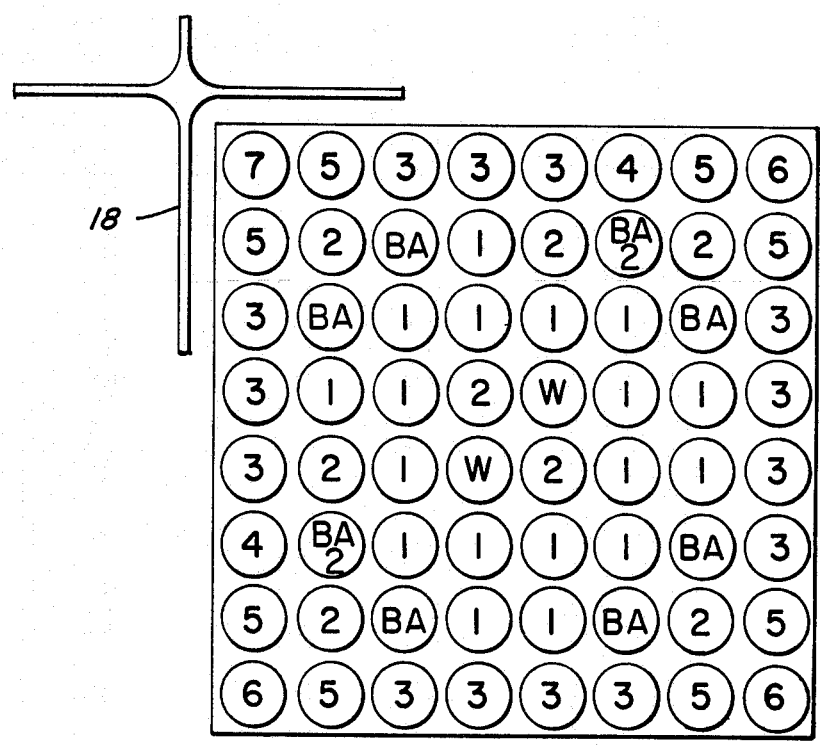
FIG. 7 illustrates an example reload fuel assembly.

An example reload fuel assembly, for use as the fresh fuel $N_0$ in the core arrangement of FIGS. 5, 6A and 6C is illustrated in FIG. 7. Notable in the design is the relatively low enrichment fuel elements in the control rod corner of the assembly which minimizes control rod history effects and allows use of the assembly in the C cell positions after its exposure in the N cells.

Special fuel elements can be used in the fuel element positions within the reload or initial core fuel assemblies that are most susceptible to damage from power changes or pellet-clad-interaction, for example, in positions 3, 4, 5 and 7 of the reload fuel assembly of FIG. 7. Such fuel elements can be fabricated with protective cladding barriers such as a layer of copper or pure zirconium which protects the cladding from fission product attack. Such damage resistant fuel elements also may include annular fuel pellets and/or fuel pellets containing an additive plasticizer.

It is noted that the assemblies of this invention may contain a greater or lesser amount of burnable absorber depending upon core requirements and the position of the particular assembly in the core.

Figure 8A:
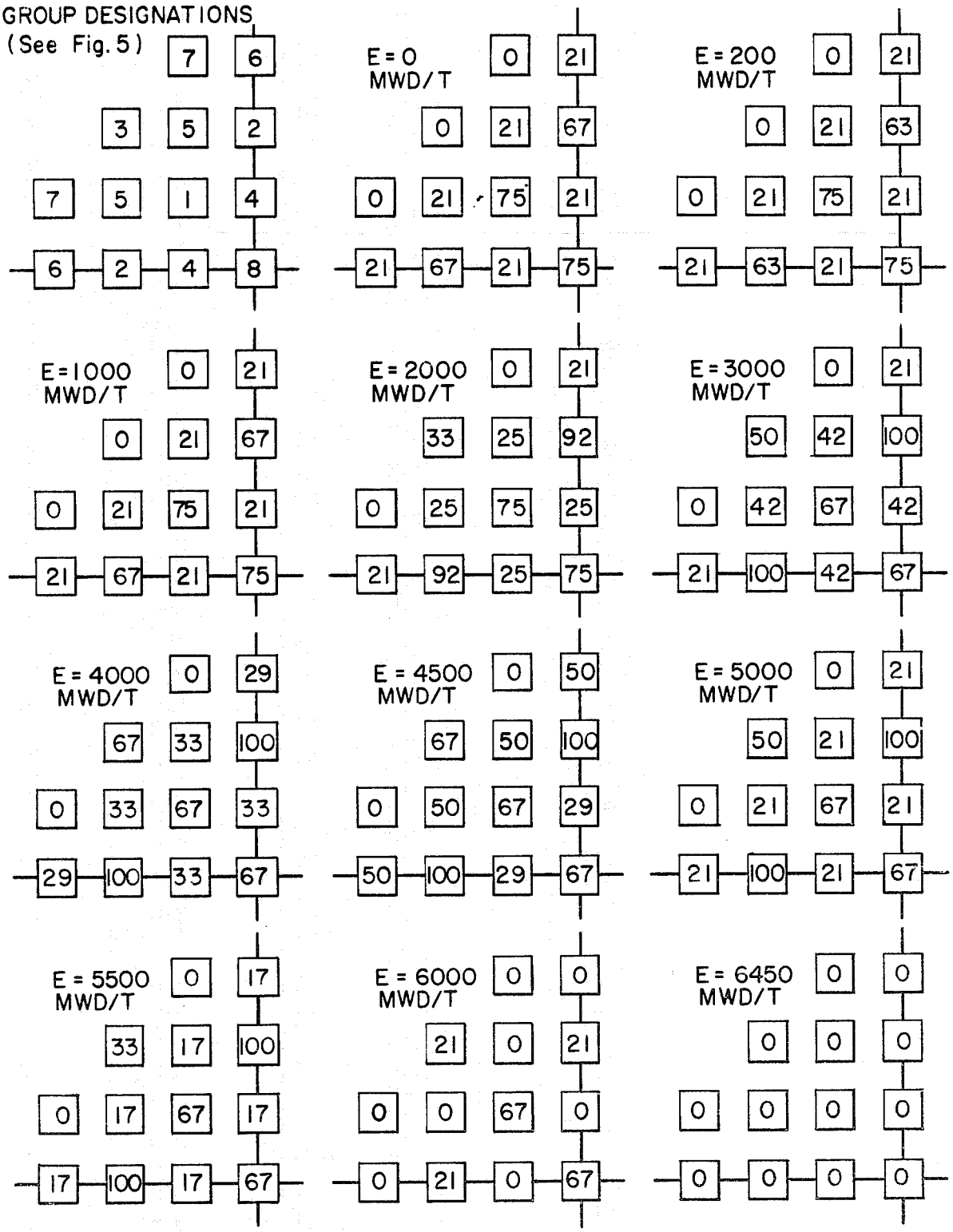
FIG. 8A illustrates example control rod patterns at various exposures during a core operating cycle.

An example of C cell control rod patterns at various exposure E throughout an operating cycle of the equilibrium core of FIG. 6A is illustrated in FIG. 8A. The control rods are operated in groups and the group designations 1–8 are the same as in FIG. 5. The numbers in the squares representing the C cells indicate the percent of the full depth insertion of the control rods of the cells. Thus, 100 indicates fully inserted and 0 indicates fully withdrawn.

No control rods outside of the control cells are used for operation at significant power and the movement of the control rods of the control cells is minimized during reactor operations.

Figure 8B:
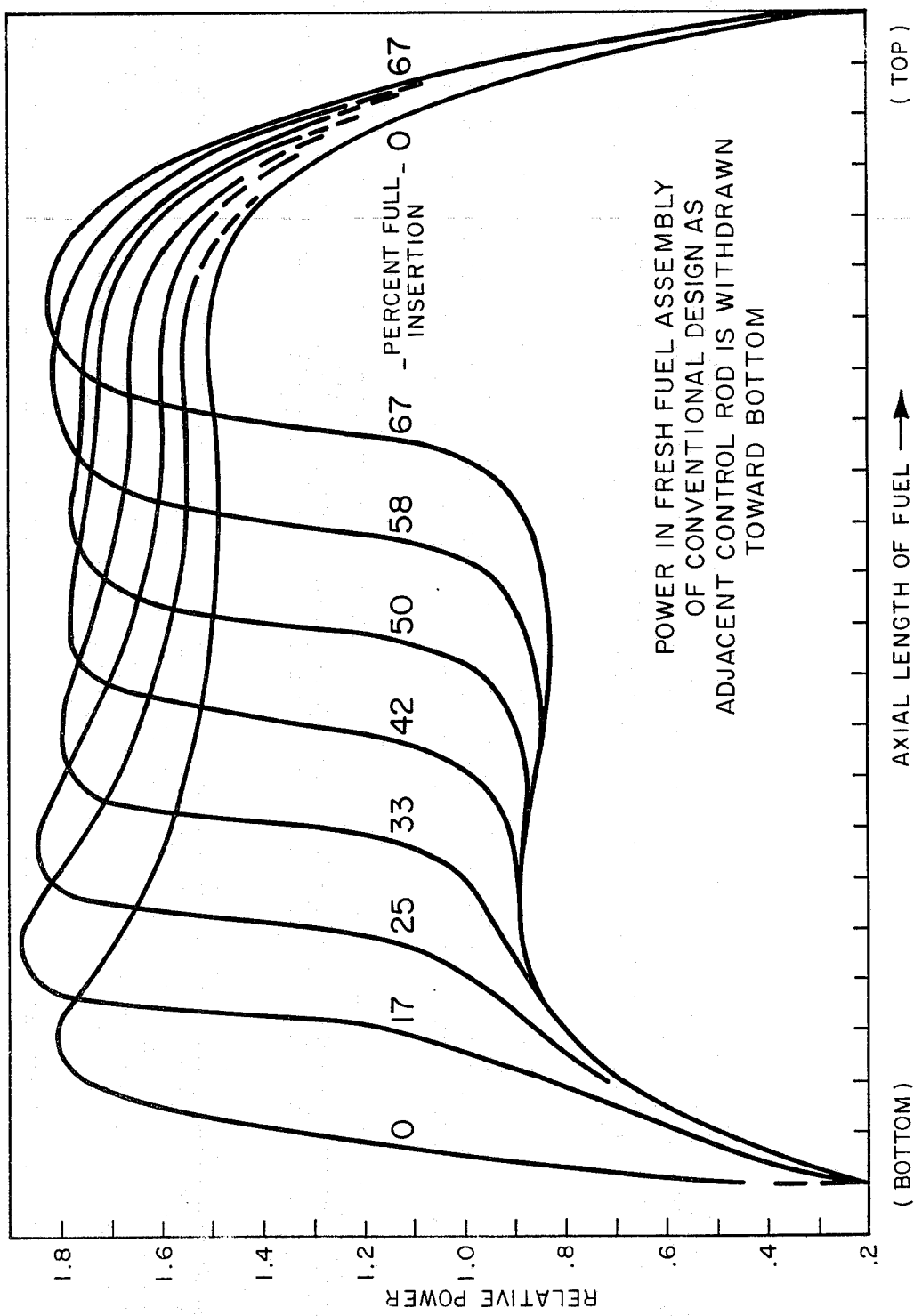
FIG. 8B illustrates the local power change in a high reactivity fuel assembly in a core of conventional design for different positions of a control rod adjacent to such assembly.

FIG. 8B illustrates the relative power adjacent to a control rod, as a function of bottom entry control rod position, for a core of conventional design and operation. This illustrates the effects of reduced steam voids in the top portion of the core with resultant high peak power generation even though the control rod is inserted in the bottom of the core.

Figure 8C:
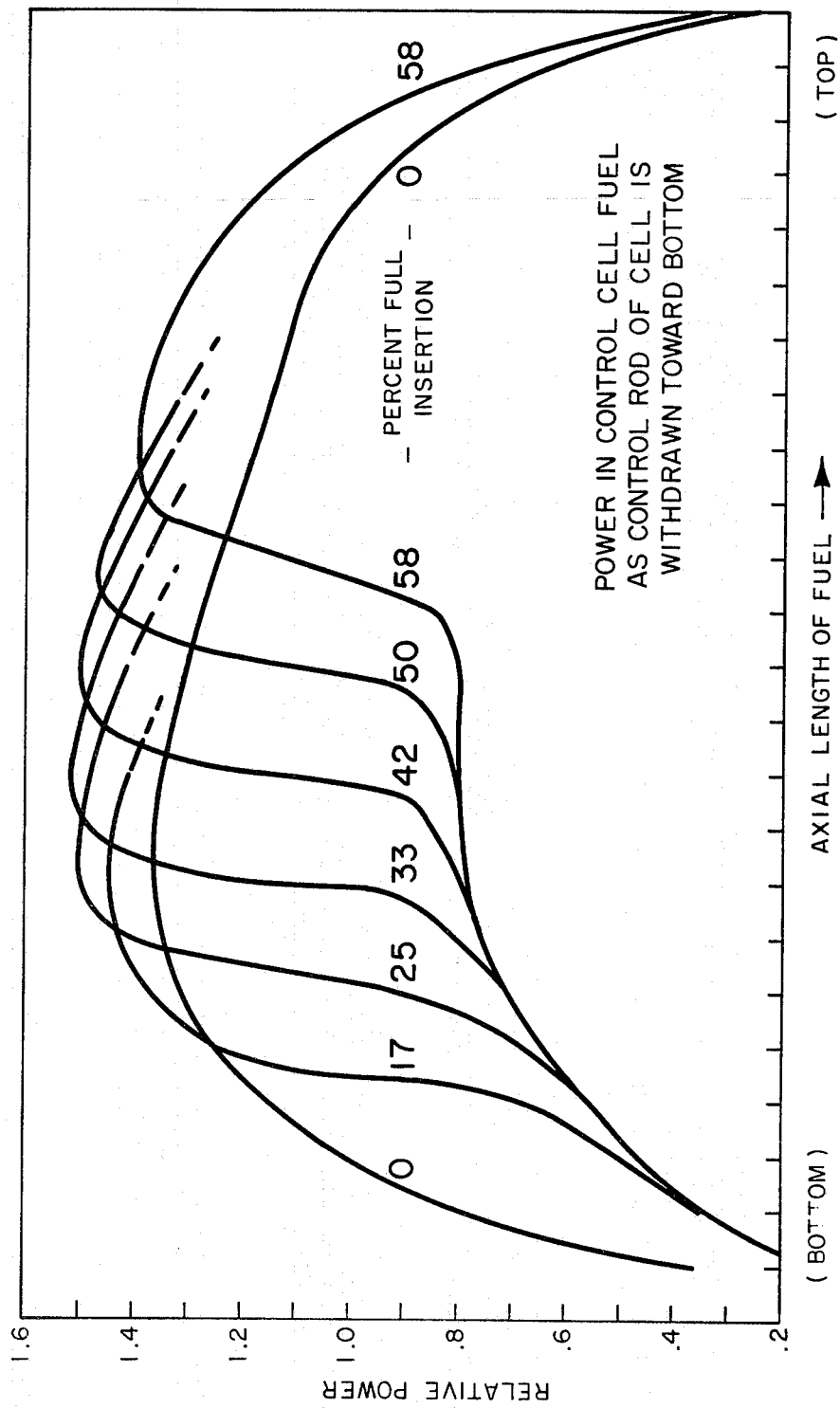
FIG. 8C illustrates typical local power change in a fuel assembly in a control cell for different positions of the control rod in the control cell.

FIG. 8C shows similar curves of relative power versus control rod position for a core of design and operation in accordance with the control cell core concept of the invention. To be noted is that (as compared to the conventional core of FIG. 8B) the peak power adjacent to the control blade is significantly reduced, it is more difficult to peak the power high or low in the core, control blades can be inserted deeper in the core without increasing power peaking, and the fully withdrawn position of the control blade results in a decrease in power over approximately the top 80 percent of the fuel.

Figure 8D:
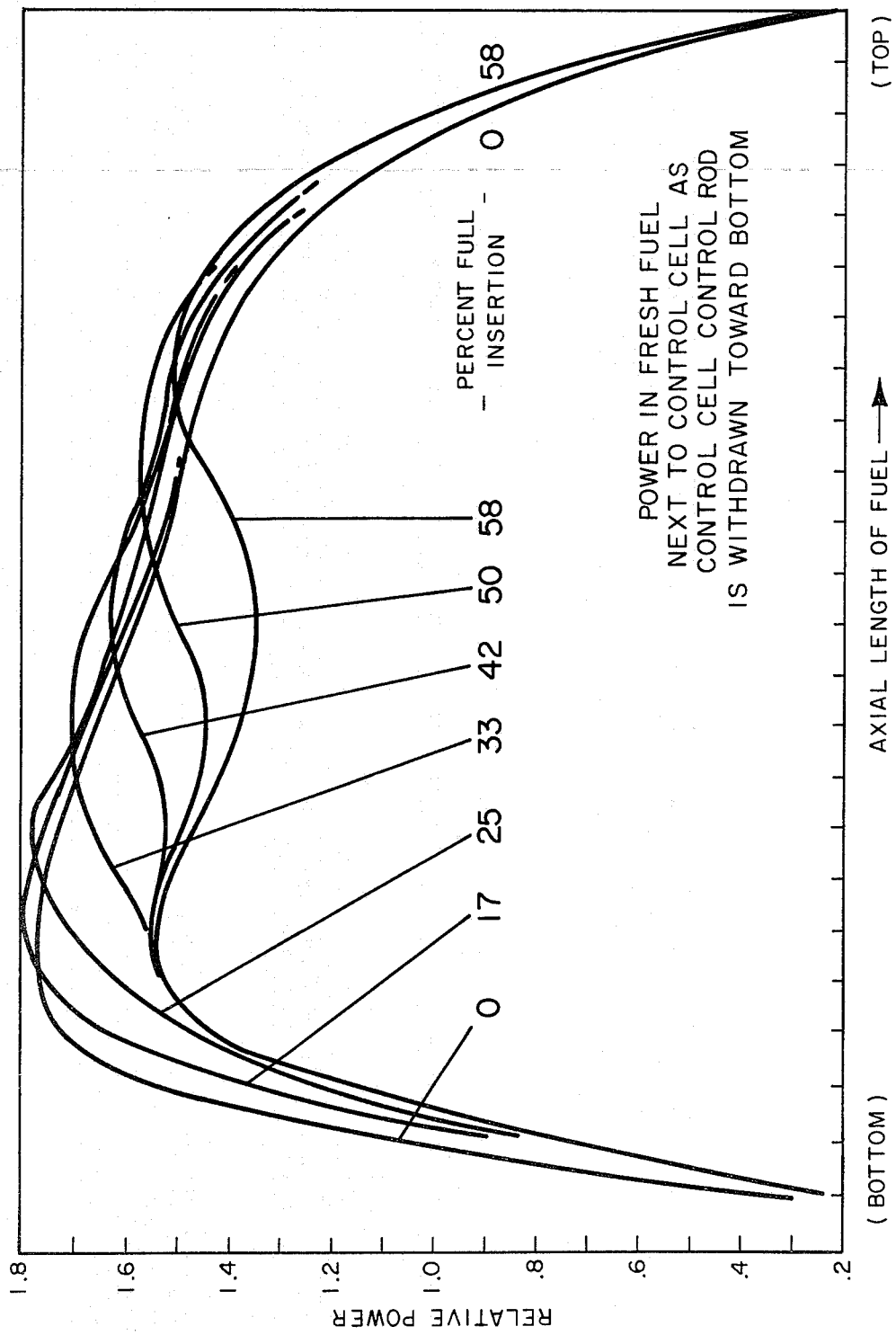
FIG. 8D illustrates typical local power change in a high reactivity fuel assembly in a non-control cell for different positions of the control rod in an adjacent control cell.

FIG. 8D illustrates the effects of control rod motion, within the control cells according to the invention, on the high reactivity fuel in the non-control cells. Compared to the high reactivity fuel power distribution trends of the conventional design (FIG. 8B), the change in power (kw/ft) during control blade motion is smaller, there is better control over the axial power peak in this fuel from partial insertion of the control cell blade, there is a smoother transition from one control rod position to another, the power increase in the top portion of the core is much smaller, and the peak reactor local power is reduced.

Thus in the control cell mode of operation, according to the invention, it is possible to insert control blades in about the bottom 17 percent of the core without significant increase of peak power in either the fuel of the control cells or the high reactivity fuel outside the control cells, i.e., in the non-control cells. Furthermore, insertion of control blades of the control cells to central core position significantly reduces the peak power in the fuel of adjacent non-control cells. These trends can be used to obtain more optimum power shapes with the control cell design than is achievable with prior methods of control that have been applied.

An important feature of control cell core of the invention is the separation of the functions of the C cell and N cell control rods. The control rods of the C cells, used for core power level and shaping control, comprise only about one-quarter of the control rods. The remainder of the control rods, those outside the C cells, have reactor shutdown as their primary function. This separation of functions, and the minimization of the number of control rods used for core power control, makes feasible the tailoring of the design of the control rods and their drives to serve the particular function in a manner not practical where all control rods and drives must serve the dual function of power shaping and shutdown.

For example, it is desirable that the control rods of the C cells have long life and that they cause but a gradual, rather than an abrupt, change in local power in the adjacent fuel as they are moved. An example control rod 181 and control rod drive 171 suitable for use in the C cells is illustrated in FIGS. 9A–9D.

The control rod 181 is formed of an upper casting 42, formed with a handle 44, connected to a lower casting 46 by a cruciform center post 48. The lower casting 46 is formed with a velocity limiter 50, guide rollers 52 and a coupling socket 54 for attachment to the drive 171. The upper casting 42 is also fitted with guide rollers 55 by which the control rod 181 is laterally supported between the fuel assemblies.

Sheaths having a U-shape are attached to the center post 48 and to upper and lower castings 42 and 46 to form the four blades 56(1)–56(4) of the control rod. Contained within each of the blades 56(1)–56(4) is a plurality of neutron absorber rods 58. A typical absorber rod, as illustrated in FIG. 9B, is formed of a sealed tube 60 containing suitable neutron absorber material such as in the form of natural boron carbide ($B_4C$) powder 62. The column of powder 62 is segmented by a series of spaced balls 64 which are restricted in movement by circumferential crimps 66 in the walls of tube 60. This arrangement aids in preventing voids in the column of powder 62 and prevents loss of all of the powder from the rod in the event of a crack in a portion thereof.

It is desirable that the control rods located in the control cells have minimum impact on adjacent fuel and therefore minimize the local power change when the control rod blade is withdrawn. This can be achieved to some extent by providing a "grey tip" on the control rod blade which both displaces the water-moderator and absorbs fewer neutrons than the stronger control materials elsewhere in the control blade.

It is also desirable that the control blades located in the control cells have a long lifetime. The tips and edges of the wings of the control blades absorb the maximum number of neutrons and limit the control blade lifetime. Selective use of a long lifetime material, which does not produce gaseous or other damaging reaction products from neutron capture in the high capture regions of the control blade will extend control blade lifetime.

Features which adapt the control rod 181 for use in the C cells are as follows: the control rod 181 may be formed with a long lifetime or "grey tip" in several ways. (By grey tip is meant that the control strength increases gradually from the top or handle end.) As illustrated in FIG. 9A the handle 44 is made wider and longer than normal and is formed, for example, of stainless steel which is a neutron absorber but of lesser control stength than boron. Thus, the enlarged handle 44 displaces water and provides a control strength transition from the tip of the body of the control rod.

Another, or addtional manner of providing a grey tip and long lifetime control rod 181 is illustrated in FIG. 9C. This is accomplished by filling the tubes 60 of the absorber rods 58 of the blades 56(1)–56(4) with the absorber material 62 to progressively lesser heights toward the outer edges of the blades.

Figures 9D, 10:
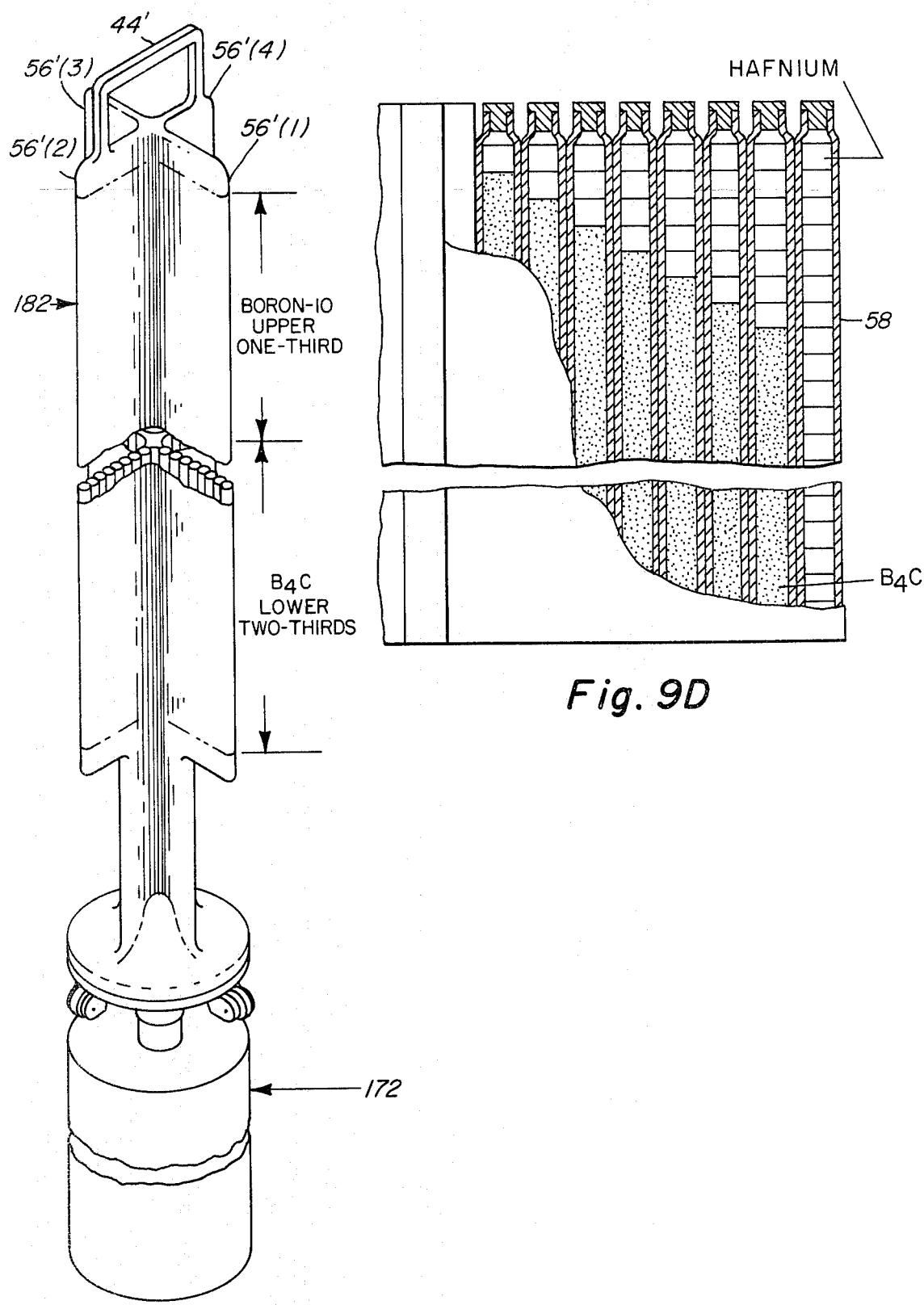

An arrangement which provides both a grey tip effect and longer control blade lifetime is illustrated in FIG. 9D. In this arrangement a suitable neutron absorber material such as hafnium replaces the boron in the top one-twenty fourth to one-fourth of the length of the inner absorber rods and in the full length of one or more of the outer absorber rods 58. Because of the steep neutron flux gradients in a control blade, the tips and outer absorber rods thereof have the highest incident neutron flux, the greatest neutron capture rate and, therefore, the shortest life. Hafnium used in these positions provides much greater blade life than $B_4C$ becuase hafnium does not produce the damaging reaction products, including gases that are produced by $B_4C$.

Also, hafnium is greyer to thermal neutrons than $B_4C$, but is a strong absorber of epithermal neutrons. Thus, it provides lesser thermal neutron absorption but greater competition with U-238 for epithermal neutrons. The result is decreased conversion of U-238, and therefore decreased control rod history effects. The greater expense of hafnium can be justified for use in the C cell control rods since they comprise less of the control rods of the core and experience the most severe duty. The control rod design of FIG. 9D minimizes cost by locating the expensive hafnium material only in the region of the control blade where this material is needed to extend control blade lifetime.

Finally, to decrease the rate of change in local power in the adjacent fuel when the control rod is moved it is desirable that the control rod drive 171 (FIG. 9A) be of the fine motion type. A suitable combined fine motion and scram drive is shown in U.S. Pat. No. 3,734,824.

The control rods outside of the C cells, i.e., the control rods of the N cells, are withdrawn when the reactor core is at power. Therefore these control rods have a long life and can feasibly be made of more strongly absorbing and more expensive material to maximize cold shutdown worth.

An example of a control rod 182 and drive 172 for use in the N cells is illustrated in FIG. 10. The general arrangement of the control rod 182 is similar to the control rod 181 of FIG. 9A. Therefore the general description will not be repeated.

In the cold state, in a boiling water reactor for example, the fuel toward the top of the core is most reactive. Therefore, in the N cell control rods it is necessary to utilize more expensive and stronger neutron absorber material only in the upper one-quarter or one-third of the absorber rods. Thus, as illustrated in FIG. 10, the unique strong shutdown blade of the absorber rods contain, for example, Boron-10 carbide in the upper one-third portions of the blades 56'(1)-56'(4) thereof and the usual $B_4C$ in the lower two-thirds of their lengths.

Finally, the control rod drive 172 can be relatively simple to provide stepwise and scram motion. A suitable such drive is shown, for example, in U.S. Pat. No. 3,020,887.

Thus what has been described is a design and an arrangement of fuel and control rods for a nuclear reactor core and a method of operation by which the core design and the operation thereof is greatly simplified with reduced risk of fuel damage. By the substantial reduction in the number of control rods that must be manipulated at power and greator rigor and simplicity in control rod patterns, automated control rod operation becomes more feasible.

What is claimed is:

1. A method of fueling and operating a nuclear reactor core having a plurality of cells wherein each cell includes a plurality of individually replaceable fuel assemblies surrounding a selectively insertable control rod and wherein said reactor is shut down after each successive cycle of periodic operation for replacement of a fraction of the fuel assemblies of said core, comprising the steps of:
   (1) designating a pattern of two kinds of cells in said core, namely, a set of control cells and a set of non-control cells wherein said control cells are separated from one another by at least one non-control cell;
   (2) placing fuel assemblies of relatively high reactivity fuel in said non-control cells, the design thereof being particularly adapted for subsequent use in said control cells, said higher reactivity being sufficient for a residence time of said fuel assemblies in said core of n cycles of operation (n being greater than 1);
   (3) placing fuel assemblies in said control cells of fuel of lower reactivity than that of said non-control cells, the design thereof being particularly adapted for use in said control cells;
   (4) operating said reactor core throughout a cycle of operation with the control rods of said non-control cells substantially withdrawn from said core and with the control rods of at least some of said control cells selectively inserted in said core to control the power level thereof;
   (5) shutting down said reactor for refueling of said core at the end of said cycle;
   (6) removing all of the fuel assemblies from each of said control cells;
   (7) replacing all of the fuel assemblies removed from said control cells with irradiated fuel assemblies moved from said non-control cells which fuel assemblies have resided in said core n−1 cycles;
   (8) inserting in said non-control cells unirradiated fuel assemblies at least equal in number to the irradiated fuel assemblies moved into said control cells, the enrichment of said unirradiated fuel assemblies providing a reactivity sufficient for a residence time in said core of n cycles of operation; and
   (9) operating said reactor core through successive cycles of operation in accordance with steps (4)-(8).

2. The method of claim 1 wherein said operating of said reactor core is such that partially inserted blades of control rods are not inserted adjacent to high reactivity fuel.

3. The method of claim 1 wherein some of said fuel assemblies contain burnable absorber and wherein said operating of said reactor core is such that partially inserted blades of control rods are not inserted adjacent to fuel containing non-depleted burnable absorber.

4. The method of claim 1 wherein steps (7) and (8) are modified by removing only some of the fuel assemblies from at least some of said control cells and replacing them with fuel assemblies from the non-control cells which have been irradiated n−1 cycles.

5. The method of claim 1 wherein steps (7) and (8) are modified by removing at least some of the fuel assemblies from at least some of said control cells and replacing them with unirradiated fuel assemblies of relatively low reactivity.

6. The method of claim 1 wherein steps (7) and (8) are modified by removing only some of the fuel assemblies from at least some of said control cells and replacing them with irradiated fuel assemblies of relatively low reactivity which have been irradiated fewer than n−1 cycles in said non-control cells.

7. The method of claim 6 wherein only fuel assemblies which include means in the fuel elements thereof to increase the resistance of the fuel elements therein to pellet-cladding-interaction is moved from said non-control cells to said control cells.

8. The method of claim 1 including the further steps of designating a set of secondary control cells containing fuel assemblies the fuel of which has a reactivity greater than the reactivity of the fuel of said control cells but less than the reactivity of the fuel of the non-control cells, employing the control rods of said secondary control cells during reactor startup and approach to full power operation and maintaining the control rods of said secondary control cells withdrawn during full power operation.

9. The method of claim 1 including the step of placing control rods having grey tips in said control cells, said grey tips providing progressively decreasing control strength along a portion of the upper ends of the control rods.

10. The method of claim 1 including the step of placing hafnium in the upper and side portions of the control rods of said control cells, the remainder of the neutron absorber material in said control rods of said control cells being boron.

11. The method of claim 1 including the step of placing control rods having greater control strength in their upper portions than in their lower portions in said non-control cells.

12. The method of claim 1 including the step of placing Boron-10 carbide in the upper one-quarter to one-third of the control rods of said non-control cells, the lower portions thereof containing natural $B_4C$.

13. The method of claim 3 wherein said unirradiated fuel assemblies inserted in said non-control cells comprise: a plurality of elongated, spaced, substantially parallel fuel elements arranged in a four-sided array, two adjacent sides of the assembly being selected for positoning adjacent the blades of a control rod in said core; a central group of said fuel elements of said assembly containing fuel of relatively high enrichment; an intermediate group of said fuel elements containing fuel of intermediate enrichment lower than said high enrichment; a peripheral group of said fuel elements containing fuel of low enrichment lower than said intermediate enrichment; corner fuel elements containing fuel of enrichment lower than said low enrichment; the one corner fuel element in in the corner formed by said predetermined adjacent sides containing fuel of enrichment lower than any other fuel element of said assembly; some of said fuel elements of said assembly containing burnable absorber; and at least one moderator conducting tube extending through said central group of said fuel elements.

14. The method of claim 1 wherein the fuel assemblies placed in said control cells in step (2) are particularly designed to tolerate control rod motion adjacent thereto including low enrichment fuel in the fuel elements of the assembly adjacent the control rod channel of the cell and the absence of burnable absorber therein.

15. A method of fueling and operating a nuclear reactor core having a plurality of individually replaceable fuel assemblies surrounding a selectively insertable control rod and wherein said reactor is shut down after each successive cycle of periodic operation for replacement of a fraction of the fuel assemblies of the core, comprising the steps of:
(1) designating a pattern of cells in said core including
  a first set of control cells sufficient in number so that the control rods thereof are capable of controlling said core at power, the cells thereof being separated from one another by at least one cell of other sets of cells,
  a second set of control cells sufficient in number so that the control rods thereof are capable of controlling said core at power, the cells thereof being separated from one another by at least one cell of other sets of cells, the cells of said second set of control cells being located in different cell positions in said core than the cells of said first set of control cells, and
  a set of non-control cells, the cells thereof being located among the cells of said first and second sets of control cells;
(2) positioning fuel assemblies of relatively high reactivity fuel in the cells of said non-control cells including at least some assemblies of unirradiated fuel having a reactivity sufficient for a residence time in said core of n cycles of operation (n being greater than 1);
(3) positioning fuel assemblies in the cells of said first set of control cells of fuel of lower reactivity than that of said non-control cells;
(4) positioning fuel assemblies in the cells of said second set of control cells which provide an average cell reactivity therein intermediate the average cell reactivity of the cells of said first set of control cells and the cells of said non-control cells, at least some of the fuel assemblies positioned in said second set of control cells having been irradiated for $n-2$ cycles of operation;
(5) operating said reactor core througout a cycle of operation with the control rods of said second set of control cells and of said non-control cells substantially withdrawn at power and with the control rods of at least some of the cells of said first set of control cells selectively inserted to control the reactor core;
(6) shutting down said reactor for refueling of said core at the end of said cycle;
(7) removing at least some of the fuel assemblies of each of the cells of said first set of control cells and replacing them with fuel assemblies of higher reactivity;
(8) removing at least some of the fuel assemblies from the cells of said non-control cells and replacing them with unirradiated fuel assemblies;
(9) positioning in the cells of said second set of control cells fuel assemblies of relatively low reactivity fuel including the retention therein of at least some of the fuel assemblies which have been irradiated for $n-1$ cycles of operation whereby movement of fuel assemblies during said refueling is minimized; and
(10) operating said reactor core throughout another cycle of operation with the control rods of the cells of said first set of control cells and of said non-control cells substantially withdrawn at power and with the control rods of at least some of the cells of said second set of control cells selectively inserted to control the reactor core.

16. The method of claim 15 wherein in step (7) the replacement fuel assemblies of the cells of said first set of control cells includes at least some fuel assemblies which have been irradiated $n-2$ cycles of operation whereby for the next subsequent cycle of operation low reactivity fuel is positioned in the cells of said first set of control cells and the control rods thereof are selectively inserted to control the reactor core with the control rods of the cells of said second set of control cells and of said non-control cells substantially withdrawn from the core at power.

17. The method of claim 15 wherein in step (8) the fuel assemblies which are positioned in said non-control cells comprise an equal mixture of fuel assemblies which have been irradiated for $n-3$ cycles and unirradiated fuel assemblies.

18. The method of claim 15 including the further step of positioning fuel assemblies of relatively low reactivity fuel in peripheral fuel assembly positions of said core.

19. The method of claim 18 including the further step of positioning fuel assemblies of higher reactivity fuel in intermediate fuel assembly positions of said core between said peripheral fuel assembly positions and said sets of cells.

20. The method of claim 19 including the step of moving at least some of the fuel assemblies of said intermediate fuel assembly positions to non-control cell positions during said refueling.

21. The method of claim 18 wherein at least some of the fuel assemblies positioned in said peripheral fuel assembly positions have been irradiated and are positioned in said peripheral positions for their last cycle of operation in said core.

22. The method of claim 15 including the step of placing control rods having grey tips in the cells of said first and second sets of control cells, said grey tips providing progressively decreasing control strength along a portion of the upper ends of the control rods.

23. The method of claim 15 including the step of placing hafnium in the upper and side portions of the control rods in the cells of said first and second sets of control cells, the remainder of the neutron absorber material in the control rods of these cells being boron.

24. The method of claim 15 including the step of placing control rods having greater control strength in their upper portions than in their lower portions in said non-control cells.

25. The method of claim 15 including the step of placing Boron-10 carbide in the upper one-quarter to one-third of the control rods of said non-control cells, the lower portions thereof containing natural $B_4C$.

26. The method of claim 15 wherein said unirradiated fuel assemblies inserted in said non-control cells comprise: a plurality of elongated, spaced, substantially parallel fuel elements arranged in a four-sided array, two adjacent sides of the assembly being selected for positioning adjacent the blades of a control rod in said core, a central group of said fuel elements of said assembly containing fuel of relatively high enrichment; an intermediate group of said fuel elements containing fuel of intermediate enrichment lower than said high enrichment; a peripheral group of said fuel elements containing fuel of low enrichment lower than said intermediate enrichment; corner fuel elements containing fuel of enrichment lower than said low enrichment; the one corner fuel element in the corner formed by said predetermined adjacent sides containing fuel of enrichment lower than any other fuel element of said assembly; some of said fuel elements of said assembly containing burnable absorber; and at least one moderator conducting tube extending through said central group of said fuel elements.

27. A method of fueling and operating a nuclear reactor core having a plurality of cells wherein each cell includes a plurality of individually replaceable fuel assemblies surrounding a selectively insertable control rod, comprising the steps of:
(1) designating a pattern of two kinds of cells in said core, namely, control cells and non-control cells wherein said control cells are separated from one another by at least one non-control cell;
(2) placing fuel assemblies of relatively low reactivity fuel in said control cells;
(3) placing fuel assemblies in said non control cells of fuel of higher reactivity than that of said control cells;
(4) placing fuel assemblies in the peripheral fuel assembly positions of said core of fuel of lower reactivity than that of said non-control cells;
(5) placing fuel assemblies in intermediate fuel assembly positions adjacent said peripheral fuel assembly positions of fuel of higher reactivity than that of the fuel assemblies of said peripheral fuel assembly positions;
(6) operating said reactor core throughout a cycle of operation with the control rods of said non-control cells withdrawn from said core and with the control rods of at least some of said control cells selectively inserted in said core to control the power level and neutron flux shape thereof;
(7) shutting down said core for refueling at the end of said cycle;
(8) removing all of the fuel assemblies from each of said control cells;
(9) replacing all of the fuel assemblies removed from said control cells with irradiated fuel assemblies from said non-control cells;
(10) removing and replacing the fuel assemblies of said peripheral fuel assembly positions;
(11) inserting unirradiated fuel assemblies in at least some of said non-control cells; and
(12) operating said reactor core through successive cycles of operation in accordance with steps (4)-(11).

28. The method of claim 27 including the step of placing control rods having grey tips in said control cells, said grey tips providing progressively decreasing control strength along a portion of the upper ends of the control rods.

29. The method of claim 27 including the step of placing hafnium in the upper and side portions of the control rods of said control cells, the remainder of the neutron absorber material in said control rods of said control cells being boron.

30. The method of claim 27 including the step of placing control rods having greater control strength in their upper portions than in their lower portions in said non-control cells.

31. The method of claim 27 including the step of placing Boron-10 carbide in the upper one-quarter to one-third of the control rods of said non-control cells, the lower portions thereof containing natural $B_4C$.

32. The method of claim 27 wherein said unirradiated fuel assemblies inserted in said non-control cells comprise: a plurality of elongated, spaced, substantially parallel fuel elements arranged in a four-sided array, two adjacent sides of the assembly being selected for positioning adjacent the blades of a control rod in said core; a central group of said fuel elements of said assembly containing fuel of relatively high enrichment; an intermediate group of said fuel elements containing fuel of intermediate enrichment lower than said high enrichment; a peripheral group of said fuel elements containing fuel of low enrichment lower than said intermediate enrichment; corner fuel elements containing fuel of enrichment lower than said low enrichment; the one corner fuel element in the corner formed by said predetermined adjacent sides containing fuel of enrichment lower than any other fuel element of said assembly; some of said fuel elements of said assembly containing burnable absorber; and at least one moderator conducting tube extending through said central group of said fuel elements.

33. In a nuclear reactor core having a plurality of cells wherein each cell includes four individually replaceable fuel assemblies surrounding a selectively insertable control rod, a method of arranging the fuel assemblies and control rods in said core, comprising the steps of:
(1) designating a pattern of two kinds of cells in said core, namely, control cells and non-control cells wherein said control cells are separated from one another by at least one non-control cell;
(2) placing fuel assemblies of relatively low reactivity fuel in said control cells;
(3) placing fuel assemblies of higher reactivity fuel in said non-control cells;
(4) placing control rods having grep tips in said control cells, said grey tips providing progressively decreasing control strength along a portion of the upper ends of the control rods; and
(5) placing control rods having greater control strength in their upper portions than in their lower portions in said non-control cells.

* * * * *